(12) United States Patent
Kinouchi et al.

(10) Patent No.: US 11,181,715 B2
(45) Date of Patent: Nov. 23, 2021

(54) LENS BARREL AND IMAGE CAPTURING DEVICE

(71) Applicant: NIKON CORPORATION, Tokyo (JP)

(72) Inventors: Yuki Kinouchi, Yokohama (JP);
Kentaro Terao, Yokohama (JP);
Satoshi Kazahaya, Yokohama (JP);
Hiroki Takita, Wako (JP); Mizuki Wayu, Yokohama (JP)

(73) Assignee: NIKON CORPORATION, Tokyo (JP)

( * ) Notice: Subject to any disclaimer, the term of this patent is extended or adjusted under 35 U.S.C. 154(b) by 159 days.

(21) Appl. No.: 16/308,650

(22) PCT Filed: Jun. 12, 2017

(86) PCT No.: PCT/JP2017/021599
§ 371 (c)(1),
(2) Date: Dec. 10, 2018

(87) PCT Pub. No.: WO2017/213266
PCT Pub. Date: Dec. 14, 2017

(65) Prior Publication Data
US 2019/0179108 A1 Jun. 13, 2019

(30) Foreign Application Priority Data

Jun. 10, 2016 (JP) .............................. JP2016-116105
Jun. 10, 2016 (JP) .............................. JP2016-116106

(51) Int. Cl.
*G02B 7/10* (2021.01)
*G02B 7/04* (2021.01)
(Continued)

(52) U.S. Cl.
CPC ............... *G02B 7/10* (2013.01); *G02B 7/021* (2013.01); *G02B 7/04* (2013.01); *G02B 15/143* (2019.08);
(Continued)

(58) Field of Classification Search
CPC . G02B 7/10; G02B 7/021; G02B 7/04; G02B 15/20; G02B 3/10; G03B 17/14
(Continued)

(56) References Cited

U.S. PATENT DOCUMENTS 6,069,745 A 5/2000 Fujii et al.
6,115,191 A * 9/2000 Ito .......................... G02B 7/102
359/699
(Continued)

FOREIGN PATENT DOCUMENTS

JP H9-096753 A 8/1997
JP H11-084216 A 3/1999
(Continued)

OTHER PUBLICATIONS

Sep. 5, 2017 International Search Report issued in International Application No. PCT/JP2017/021599.
(Continued)

*Primary Examiner* — James R Greece
(74) *Attorney, Agent, or Firm* — Oliff PLC

(57) ABSTRACT

A lens barrel includes: a first lens; a first tube that holds the first lens and moves along an optical axis; a focusing lens; an actuator that drives the focusing lens; and a second tube that holds the focusing lens and the actuator and moves along the optical axis.

11 Claims, 17 Drawing Sheets

(51) Int. Cl.
  *G03B 17/14* (2021.01)
  *G03B 3/10* (2021.01)
  *G02B 15/14* (2006.01)
  *G02B 7/02* (2021.01)

(52) U.S. Cl.
  CPC ............... *G03B 3/10* (2013.01); *G03B 17/14* (2013.01); *G03B 2205/0046* (2013.01)

(58) Field of Classification Search
  USPC .......................................................... 359/696
  See application file for complete search history.

(56) References Cited

U.S. PATENT DOCUMENTS

| | | | | |
|---|---|---|---|---|
| 6,339,681 B1* | 1/2002 | Takeshita | ................ | G02B 7/04 396/349 |
| 6,553,185 B1* | 4/2003 | Inaba | .................... | G03B 17/00 359/676 |
| 2005/0134976 A1 | 6/2005 | Yano | | |

FOREIGN PATENT DOCUMENTS

| | | |
|---|---|---|
| JP | H11-218665 A | 8/1999 |
| JP | 2000-098210 A | 4/2000 |
| JP | 2000-275499 A | 10/2000 |
| JP | 2000-330155 A | 11/2000 |
| JP | 2001-042193 A | 2/2001 |
| JP | 3186543 B2 | 7/2001 |
| JP | 2002-341225 A | 11/2002 |
| JP | 2003-075707 A | 3/2003 |
| JP | 2003-177297 A | 6/2003 |
| JP | 2005-156853 A | 6/2005 |
| JP | 2006-091508 A | 4/2006 |
| JP | 2006-309053 A | 11/2006 |
| JP | 2007-079206 A | 3/2007 |
| JP | 2010-113108 A | 5/2010 |
| JP | 2012-88452 A | 5/2012 |
| JP | 2012-173524 A | 9/2012 |
| JP | 2015-045791 A | 3/2015 |

OTHER PUBLICATIONS

Feb. 2, 2021 Office Action issued in Japanese Patent Application No. 2018-521797.
Dec. 2, 2020 Office Action issued in Chinese Patent Application No. 201780035642.7.
May 25, 2021 Office Action issued in Japanese Patent Application No. 2018-521797.
Jul. 5, 2021 Office Action issued in Chinese Patent Application No. 201780035642.7.

* cited by examiner

LENS BARREL AND IMAGE CAPTURING DEVICE

TECHNICAL FIELD

The present invention relates to a lens barrel and an image capturing device.

BACKGROUND ART

A zooming lens barrel known in the related art comprises a fixed lens group, a variable magnification lens group and a focusing lens group (see PTL1). In this zooming lens barrel, a focusing lens drive source supported at the lens barrel is connected with a focusing lens holding frame so that the focusing lens group, driven by the drive source, is able to move along a direction of the optical axis.

However, since a variable magnification lens holding frame must be set apart from the drive source and the like over sufficient distances in order to ensure that the variable magnification lens holding frame does not obstruct the focusing lens drive source and the like while the variable magnification lens holding frame moves along the optical axis during a zooming operation, the overall length of the lens barrel is bound to become significant.

CITATION LIST

Patent Literature

PTL1: Japanese Patent Publication No. 3186543

SUMMARY OF INVENTION

A lens barrel according to a first aspect of the present invention comprises: a first lens; a first tube that holds the first lens and moves along an optical axis; a focusing lens; an actuator that drives the focusing lens; and a second tube that holds the focusing lens and the actuator and moves along the optical axis.

An image capturing device according to a second aspect of the present invention includes the lens barrel according to the first aspect.

DESCRIPTION OF EMBODIMENTS

First Embodiment

In reference to FIGS. 1 through 7, the first embodiment of the lens barrel will be described.

Figure 1:
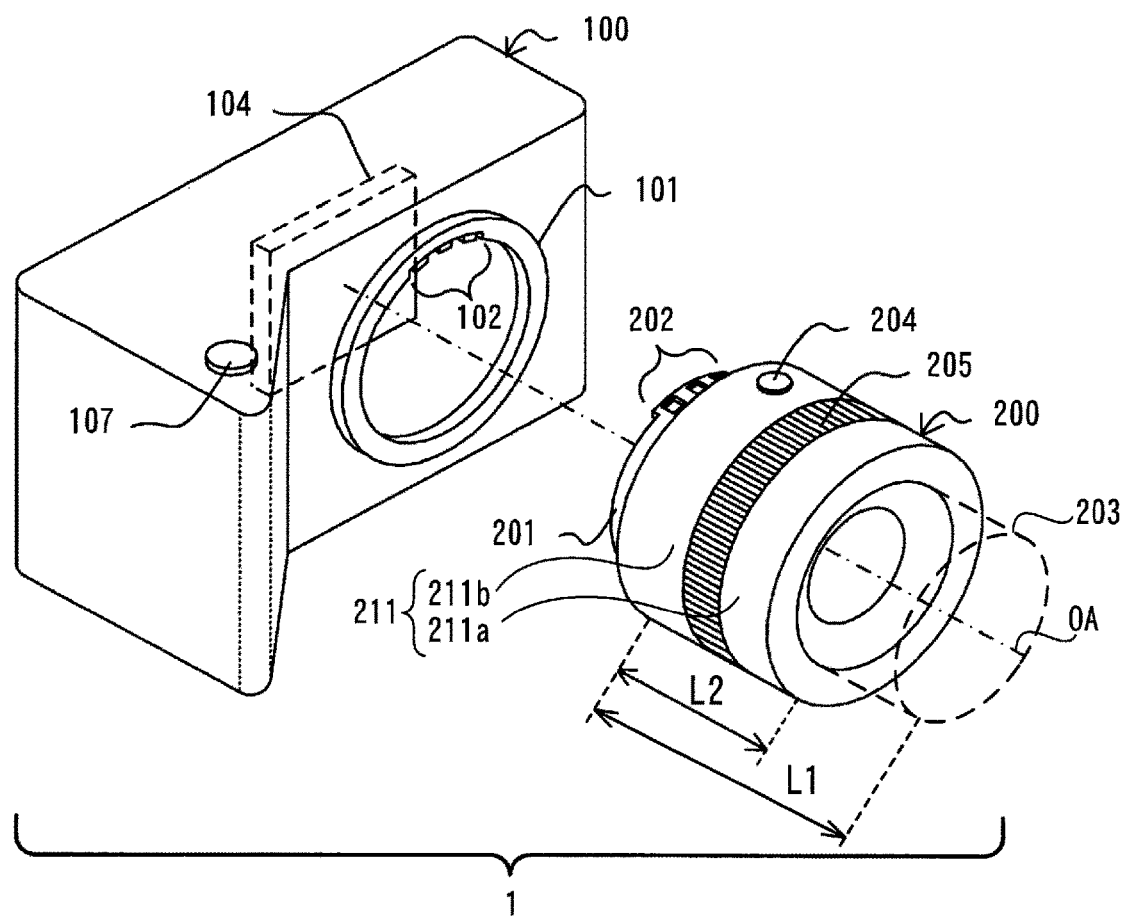
FIG. 1 A perspective of a camera system of an interchangeable-lens type, according to a first embodiment of the present invention FIG. 2 A sectional view of part of the interchangeable lens barrel in an extended state FIG. 3 A sectional view of part of the interchangeable lens barrel in an extended state FIG. 4 A drawing pertaining to part of the interchangeable lens barrel in an exploded view FIG. 5 A drawing pertaining to part of the interchangeable lens barrel in an exploded view FIG. 6 A drawing pertaining to part of the interchangeable lens barrel in an exploded view FIG. 7 A sectional view of part of the interchangeable lens barrel in a contracted state FIG. 8 A perspective of a camera system of an interchangeable-lens type, according to a second embodiment of the present invention FIG. 9 A sectional view of part of the interchangeable lens barrel in an extended state FIG. 10 A sectional view of part of the interchangeable lens barrel in an extended state FIG. 11 A sectional view of part of the interchangeable lens barrel in an extended state FIG. 12 A sectional view of part of the interchangeable lens barrel in an extended state FIG. 13 A drawing pertaining to part of the interchangeable lens barrel in an exploded view FIG. 14 A drawing pertaining to part of the interchangeable lens barrel in an exploded view FIG. 15 A drawing pertaining to part of the interchangeable lens barrel in an exploded view FIG. 16 A sectional view of part of the interchangeable lens barrel in a contracted state FIG. 17 A sectional view of part of the interchangeable lens barrel in a contracted state

FIG. 1 shows, in a perspective, a camera system of an interchangeable-lens type, having the lens barrel according to the embodiment included as an interchangeable lens thereof. A camera system 1 includes a camera body 100 and an interchangeable lens barrel 200 that can be detachably mounted at the camera body 100.

A body-side lens mount 101, at which the interchangeable lens barrel 200 is detachably mounted, is disposed at the camera body 100. A lens-side lens mount 201, corresponding to the body-side lens mount 101, at which the camera body 100 is detachably mounted, is disposed at the interchangeable lens barrel 200. As the interchangeable lens barrel 200 is mounted at the camera body 100, a contact group 102, which is located on the body-side lens mount 101 and is made up with a plurality of contacts, becomes connected with a contact group 202, which is disposed on the lens-side lens mount 201 and is made up with a plurality of contacts. The contact groups 102 and 202 are used to provide power from the camera body 100 to the interchangeable lens barrel 200 and to enable signal exchange between the camera body 100 and the interchangeable lens barrel 200.

An image sensor 104, which captures a subject image and outputs image capturing signals, is disposed inside the camera body 100 further rearward relative to the body-side lens mount 101. At the top of the camera body 100, a button 107, which is used as an input device, is disposed. The user is able to issue a photographing instruction, a photographing condition setting instruction and the like to the camera body 100 via the button 107. It is to be noted that the button 107 in the illustration represents a plurality of buttons fulfilling various functions, disposed at a plurality of locations at the camera body 100.

The interchangeable lens barrel 200 in the embodiment includes a fixed tube 211 constituted with first and second tubular or cylindrical members 211a and 211b, which cover the outer circumferential area of the interchangeable lens barrel 200, and a zooming ring 205 disposed between the first tubular member 211a and the second tubular member 211b. The interchangeable lens barrel 200 is a lens barrel generally known as a manual zooming lens with a variable focal length that can be manually adjusted by the user by operating the zooming ring 205. As the user rotates the zooming ring 205, the focal length of the interchangeable lens barrel 200 continuously changes toward a wide angle side or toward a telephoto side. In other words, the focal length of the interchangeable lens barrel 200 can be freely selected between the telephoto end position and the wide-angle end position by operating the zooming ring 205.

In addition, as will be described in detail later, the interchangeable lens barrel 200 is a telescopic lens barrel, which may assume an extended state with a lens inner barrel 203 that holds the entirety of, or part of, a photographic optical system extending from the fixed tube 211 or a contracted state with the lens inner barrel housed inside the fixed tube 211. It is to be noted that the lens inner barrel 203 in the extended state is indicated with a dotted line in FIG. 1.

The interchangeable lens barrel 200 is switched from the extended state to the contracted state and vice versa by operating a retract release button 204 and the zooming ring 205. Namely, the interchangeable lens barrel 200 in the extended state has its inner barrel 203 extended, i.e., projecting out, from the fixed tube 211 and a barrel length L of the interchangeable lens barrel 200 in this state is thus L1. Via the interchangeable lens barrel 200 in the extended state, a good subject image can be formed at the image sensor 104 through its entire zooming range. In order to switch from the extended state to the contracted state, the zooming ring 205 is rotated further toward the wide-angle side beyond the rotational position for adjusting the focal length of the lens to the wide-angle end, while pressing down on the retract release button 204. In response to this supplemental rotating operation, the inner barrel 203 becomes housed inside the fixed tube 211, thereby setting the interchangeable lens barrel 200 in the contracted state. A lens barrel length L2 in the contracted state is smaller than the lens barrel length L1 in the extended state. The retract release button 204 constitutes part of a structure fulfilling a mechanical lock function for physically preventing a transition into the contracted state while the lens is set between the wide-angle end and the telephoto end.

Once the interchangeable lens barrel 200 enters the contracted state, the zooming ring 205 cannot be rotated unless the retract release button 204 is also being depressed. In other words, the retract release button 204 constitutes part of a structure fulfilling a mechanical lock function for physically preventing a transition from the contracted state to the extended state.

As described above, the user must rotate the zooming ring 205, set at the rotational position corresponding to the wide-angle end, further toward the wide-angle side while pressing down on the retract release button 204 in order to switch the interchangeable lens barrel 200 in the extended state to the contracted state. In addition, the user wishing to switch the interchangeable lens barrel 200 in the contracted state to the extended state must rotate the zooming ring 205 toward the telephoto side while pressing down on the retract release button 204.

Figure 2:
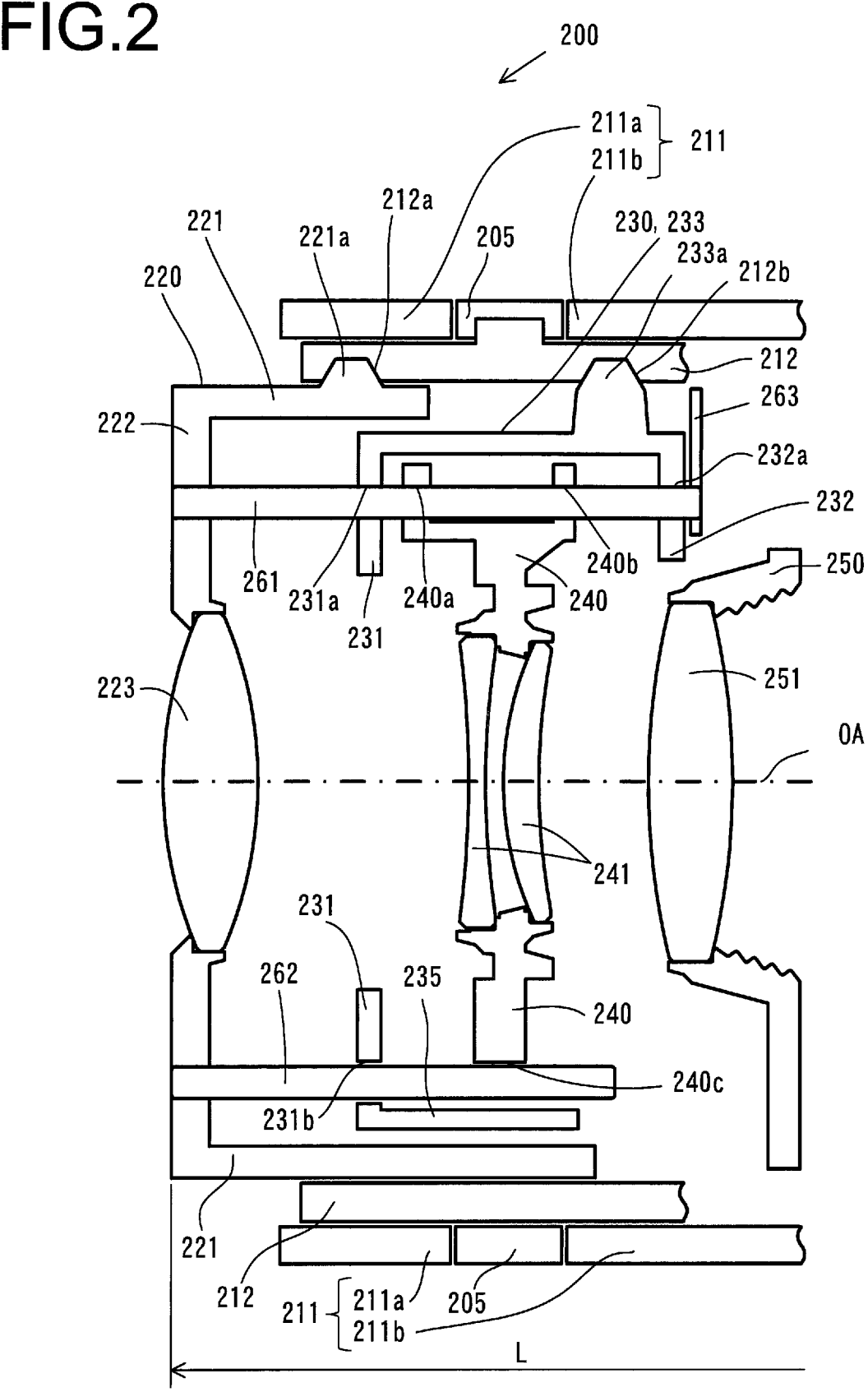
Figure 3:
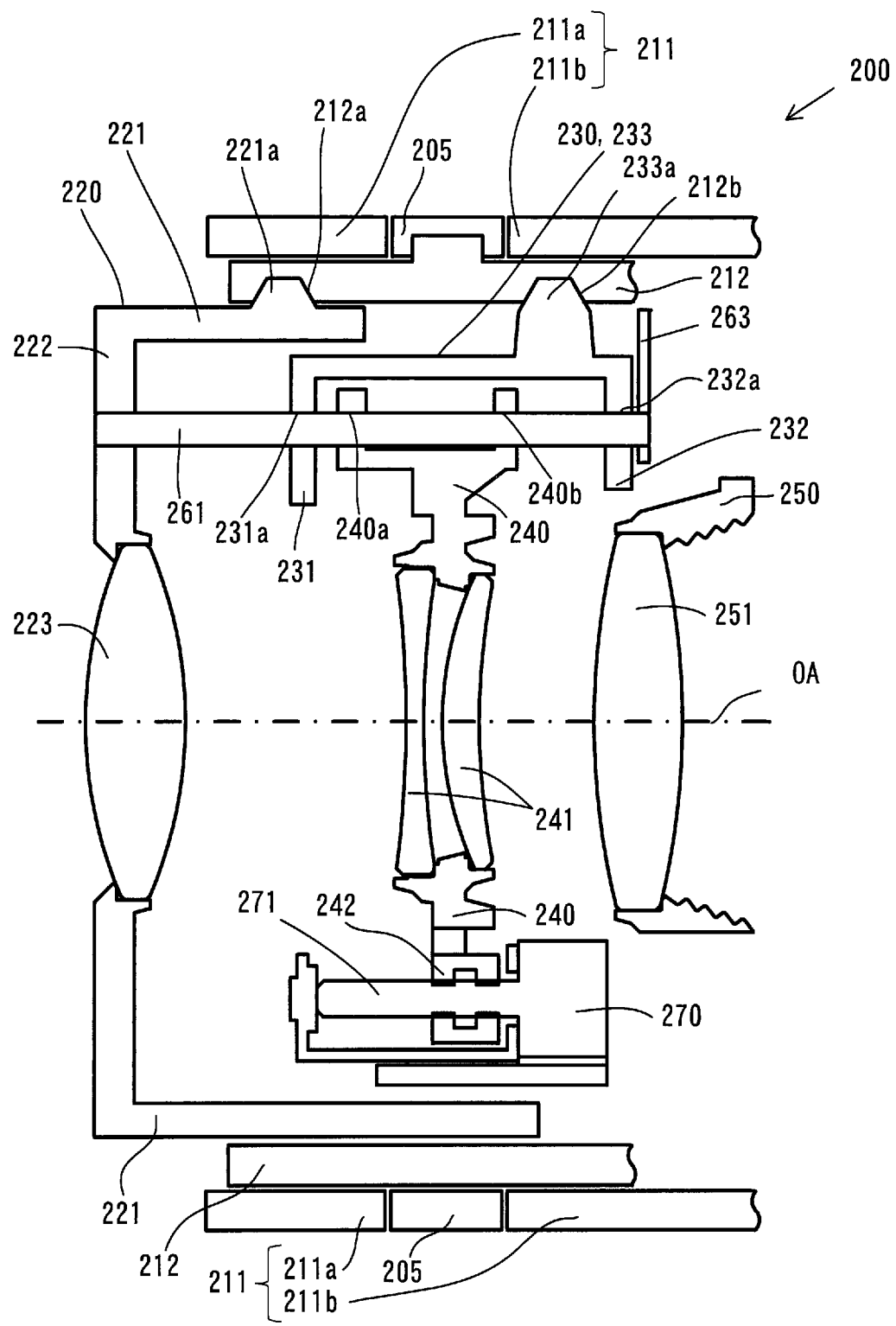
Figure 4:
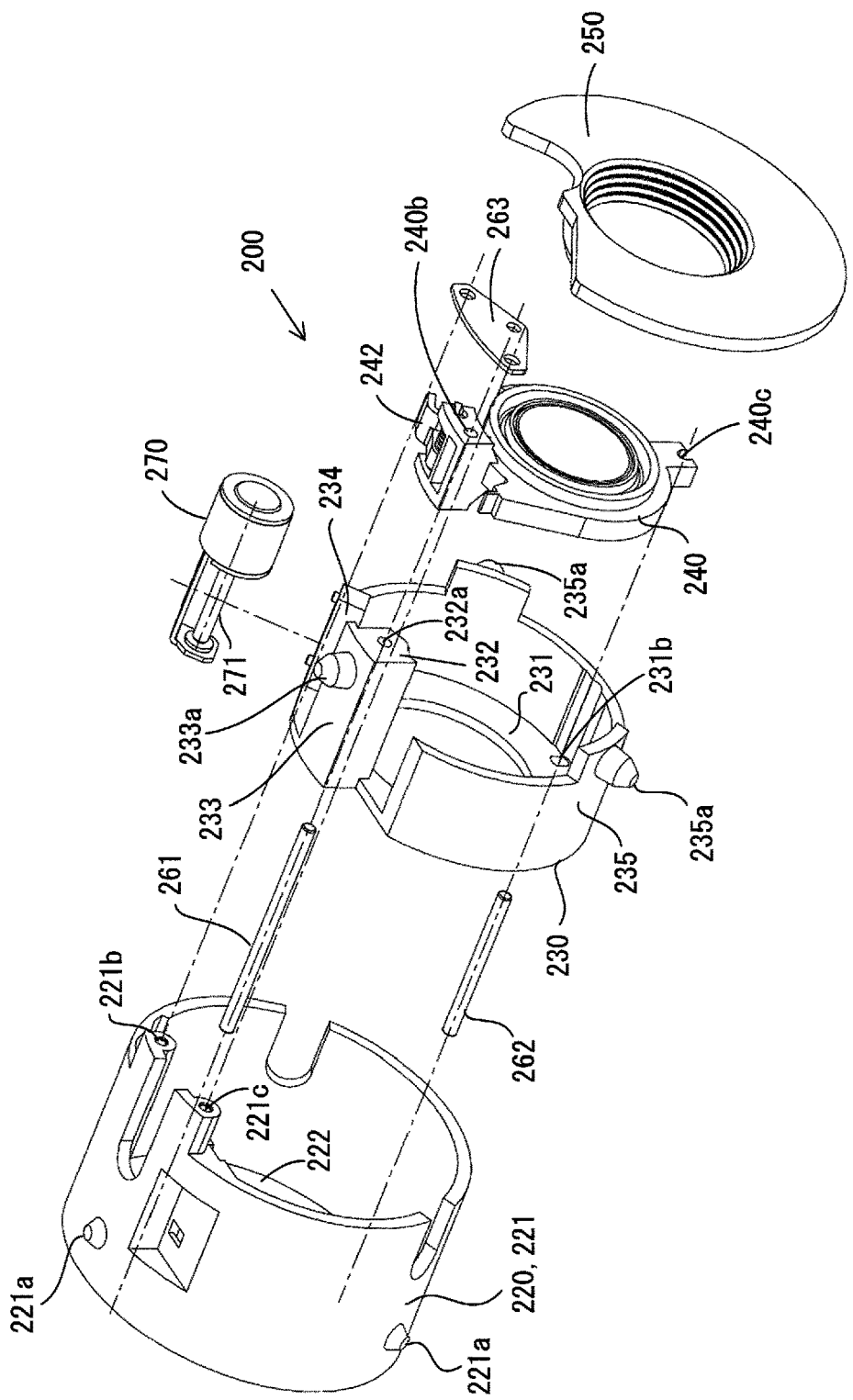
Figure 5:
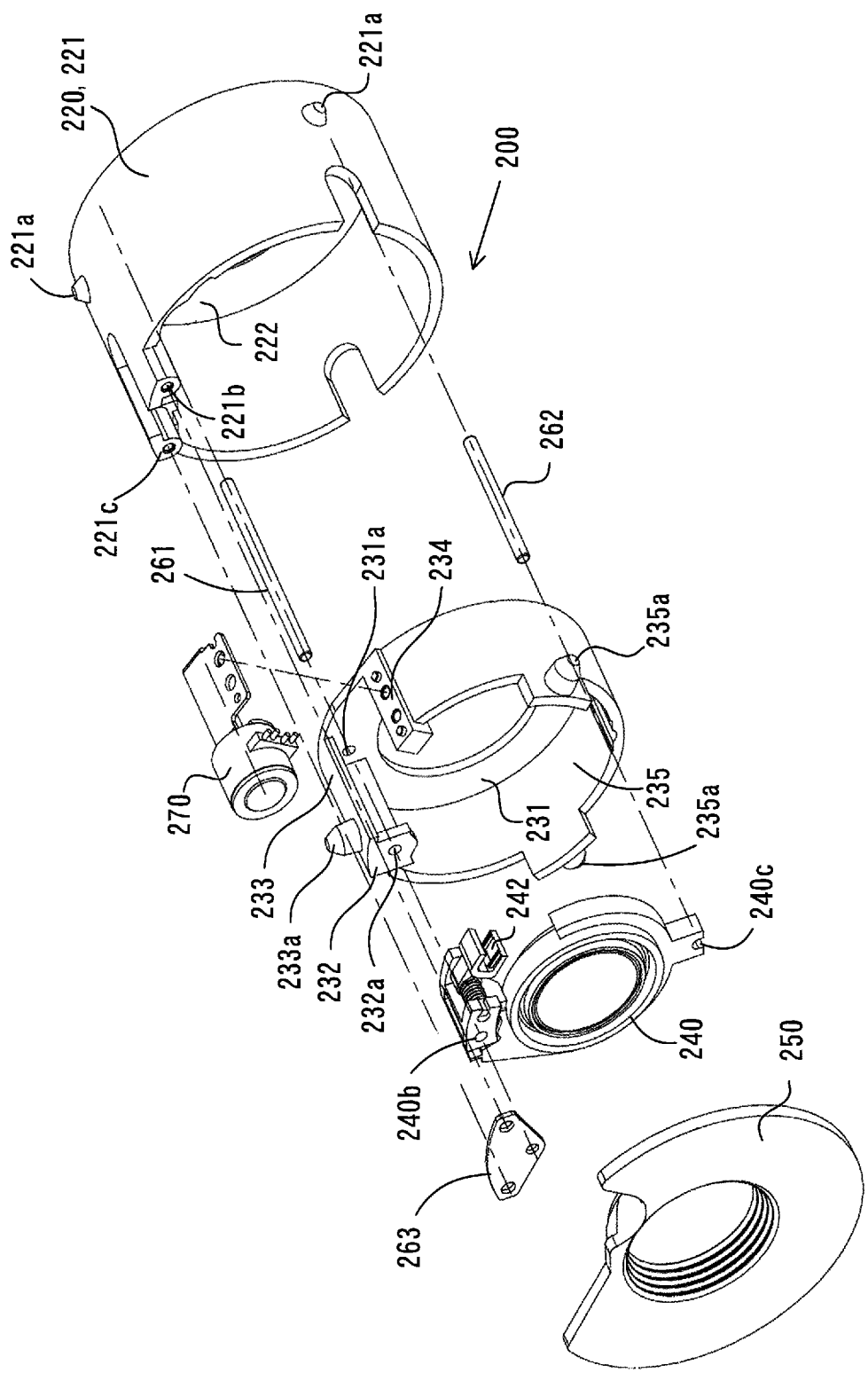
Figure 6:
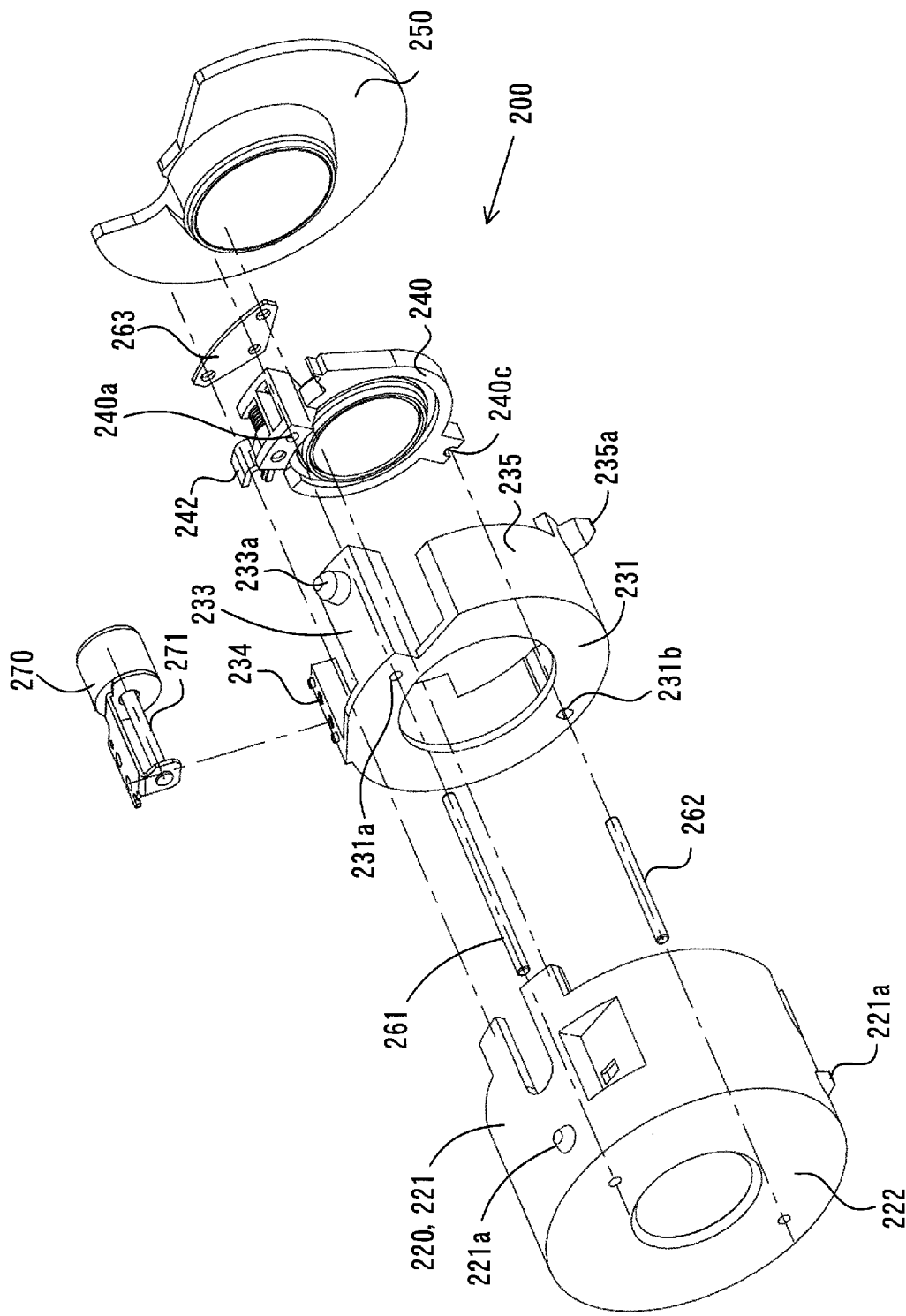

FIGS. 2 and 3 each show part of the interchangeable lens barrel 200 in the extended state in a sectional view. FIG. 2 is a sectional view that includes a main guide bar 261 and a sub guide bar 262, whereas FIG. 3 is a sectional view which includes the main guide bar 261 and an AF stepping motor 270. FIGS. 4 through 6 each show part of the interchangeable lens barrel 200 in an exploded view.

As shown in FIG. 2, the interchangeable lens barrel 200 includes the fixed tube 211, the zooming ring 205, a cam barrel 212 that fits at the inner circumference of the fixed tube 211, a first lens group chamber 220 that fits at the inner circumference of the cam barrel 212, a stepping motor (STM) mounting tube 230, an AF lens group chamber 240 and a second lens group chamber 250.

In the embodiment, the first lens group chamber 220 is equivalent to the inner barrel 203 in FIG. 1, which projects out, i.e., extends, from the fixed tube 211 in the extended state. In addition, the left side is designated as the subject side and the right side is designated as the image sensor side in FIGS. 2 and 3. It is to be noted that another lens may be present further toward the subject side relative to the first lens group chamber 220. In addition, another lens may be present further toward the image sensor side relative to the second lens group chamber 250.

As shown in FIG. 2, the zooming ring 205 is disposed between the first tubular member 211a and the second tubular member 211b of the fixed tube 211, as has been explained earlier, and the zooming ring 205 is fixed to the cam barrel 212.

A first cam groove 212a and a second cam groove 212b are formed on the inner circumferential side of the cam barrel 212, which is caused to rotate as the zooming ring 205 is rotated.

As shown in FIGS. 2 and 4, the first lens group chamber 220 includes a cylindrical tube portion 221 and a lens holding portion 222 assuming a hollow disk shape, which holds a first lens group 223 at the subject side of the tube portion 221. The lens holding portion 222 is fixed to the left end of the tube portion 221. At the outer circumference of the tube portion 221, a cam follower 221a that fits in the first cam groove 212a at the cam barrel 212 is disposed, and the first lens group chamber 220 is caused to move rectilinearly as the cam barrel 212 rotates. This means that as the user rotates the zooming ring 205, the first lens group chamber 220 moves along an optical axis OA.

The main guide bar 261 and the sub guide bar 262, which guide the STM mounting tube 230 and the AF lens group chamber 240 along the optical axis OA, are mounted at the lens holding portion 222. The main guide bar 261 and the sub guide bar 262 are disposed near positions that face each other across the optical axis OA, with their subject-side ends attached to the lens holding portion 222, each ranging toward the image sensor along the optical axis OA (see FIGS. 4 through 6). As shown in FIG. 4, a pair of screw holes 221b and 221c are formed at the right end of the tube portion 221, i.e., at the end located toward the image sensor, in the first lens group chamber 220, so as to allow a main guide bar adjustment plate 263 to be mounted at the right end of the tube portion 221 via screws (not shown) and the pair of screw holes 221b and 221c. The end of the main guide bar 261 located on the image sensor side is mounted at the main guide bar adjustment plate 263. Thus, one end of the main guide bar 261 is supported by the lens holding portion 222 and the other end of the main guide bar 261 is supported by the main guide bar adjustment plate 263. By adjusting the position at which the main guide bar adjustment plate 263 is mounted at the tube portion 221, the main guide bar 261 is set to be parallel to the optical axis OA. In addition, the end of the sub guide bar 262 located on the image sensor side is not supported, i.e., not fixed.

The STM mounting tube 230 is a member mounted inside the first lens group chamber 220 via the main guide bar 261 and the sub guide bar 262, and the AF stepping motor 270 is mounted at the STM mounting tube 230, as shown in FIGS. 4 through 6. The STM mounting tube 230 includes a tube portion 235 assuming a partially cylindrical shape, a first guide plate 231 having a flange shape and mounted at one end surface of the tube portion 235, a second guide plate 232 set apart from the first guide plate 231 along the direction of the optical axis OA, a linking portion 233 mounted at the tube portion 235, which links the first guide plate 231 and the second guide plate 232 with each other, and an STM mounting portion 234 attached to the tube portion 235. Cam followers 233a and 235a, which fit in the second cam groove 212b at the cam barrel 212, are disposed at the outer circumferences of the linking portion 233 and the tube portion 235 respectively, and the STM mounting tube 230 is caused to move rectilinearly as the cam barrel 212 rotates. In other words, as the user adjusts the focal length of the interchangeable lens barrel 200 by rotating the zooming ring 205, the STM mounting tube 230 moves along the optical axis OA.

The AF stepping motor 270 is fixed to the STM mounting portion 234 via a screw or the like. An insertion hole 231a at which the main guide bar 261 is inserted and an insertion hole 231b at which the sub guide bar 262 is inserted are formed at the first guide plate 231. In addition, an insertion hall 232a at which the main guide bar 261 is inserted is formed at the second guide plate 232.

The STM mounting tube 230 is allowed to slide with respect to the main guide bar 261 and the sub guide bar 262 along the direction of the optical axis OA, and is guided by the main guide bar 261 and the sub guide bar 262 so that it moves relative to the first lens group chamber 220 along the optical axis OA.

The AF stepping motor 270, with a lead screw 271 directly connected to an output shaft thereof, is started up according to a focusing operation or a zooming operation.

As shown in FIG. 2, an AF lens group 241 is held in the AF lens group chamber 240, which is attached to the first lens group chamber 220 via the main guide bar 261 and the sub guide bar 262. It is to be noted that the AF lens group 241 is a focusing lens and also configures, in conjunction with the first lens group 223, a zooming lens.

At the AF lens group chamber 240, insertion holes 240a and 240b, at which the main guide bar 261 is inserted, and a semi-circular hole 240c, at which the sub guide bar 262 is inserted, are formed. The AF lens group chamber 240 is slidably guided by the main guide bar 261 and the sub guide bar 262 along the optical axis OA.

As shown in FIGS. 3 and 4, a rack portion 242 is mounted at the AF lens group chamber 240. The rack portion 242 is threaded to interlock with the lead screw 271 of the AF stepping motor 270. This means that the AF stepping motor 270 mounted at the STM mounting tube 230 and the AF lens group chamber 240 are linked with each other via the lead screw 271 and the rack portion 242 interlocking with each other.

As a result, as the AF stepping motor 270 is driven to rotate, the AF lens group chamber 240 is caused to move along the optical axis OA relative to the STM mounting tube 230 and also, as the zooming ring 205 is rotated as explained earlier, the AF lens group chamber 240 is caused to move along the optical axis OA as one with the STM mounting tube 230.

The structure adopted in the embodiment described above allows both the AF lens group chamber 240, which is driven by the AF stepping motor 270, and the STM mounting tube 230, at which the AF stepping motor 270 is mounted, to be guided by the common main guide bar 261 to move along the optical axis OA. Thus, as the tilt of the main guide bar 261 relative to the optical axis OA is adjusted through adjustment of the position at which the main guide bar adjustment plate 263 is mounted at the tube portion 221, the direction along which the AF stepping motor 270 and the AF lens group chamber 240 move along the direction in which the main guide bar 261 extends is also adjusted.

Through these measures, the lead screw 271 and the rack portion 242 are allowed to interlock with each other in a stable manner. Namely, since the tilt of the main guide bar 261 relative to the optical axis OA can be adjusted without affecting the state of interlock between the lead screw 271 and the rack portion 242, the accuracy of the focus control can be stabilized. For instance, the attitude of the AF lens group 241 may be adjusted by intentionally tilting the main guide bar 261 relative to the optical axis OA in order to improve the optical performance of the interchangeable lens barrel 200. The embodiment, which assures stable focus control accuracy even when the main guide bar 261 is tilted relative to the optical axis OA as described above, contributes to an improvement of the optical performance of the interchangeable lens barrel 200.

As shown in FIG. 2, the second lens group chamber 250 is a lens chamber that holds a second lens group 251. The second lens group chamber 250 is fixed in the embodiment. The second lens group chamber 250 is set apart from the STM mounting tube 230 and the AF lens group chamber 240, as shown in FIGS. 2 and 3.

—Operations of Various Components of the Interchangeable Lens Barrel 200 in the Extended State—

A zooming operation executed at the interchangeable lens barrel 200 will be explained first. As the zooming ring 205 is rotated at the interchangeable lens barrel 200 in the extended state shown in FIG. 2, the cam barrel 212 rotates and as a result, the first lens group chamber 220 and the STM mounting tube 230 move along the optical axis OA respectively through the first cam groove 212a and through the second cam groove 212b. As the first lens group chamber 220 moves, the first lens group 223 moves along the optical axis and, at the same time, the movement of the STM mounting tube 230 causes the AF lens group 241 to move along the optical axis OA due to the linkage between the AF stepping motor 270 and the AF lens group chamber 240. Thus, a magnification adjustment operation, i.e., a zooming operation, is executed while the focus position or focus is maintained.

It is to be noted that a magnification adjustment operation is executed while the focus position remains unchanged, as described above, at the interchangeable lens barrel 200 according to the embodiment, as the zooming ring 205 is rotated to cause the first lens group 223 and the AF lens group 241 to move along the optical axis relative to each other. However, as an alternative, when the first lens group 223 and the AF lens group 241 are caused to move along the optical axis by rotating the zooming ring 205 as described above, the AF lens group 241 may be caused to move along the optical axis OA relative to the STM mounting tube 230 via the AF stepping motor 270. Through these measures, any fluctuation of the focus position during the zooming operation can be prevented with high accuracy.

Next, a focusing operation executed at the interchangeable lens barrel 200 will be explained. As the AF stepping motor 270 shown in FIG. 3 is driven at the interchangeable lens barrel 200 in the extended state, the AF lens group chamber 240 is caused to move along the optical axis OA relative to the STM mounting tube 230 as described above, and the AF lens group 241, too, is caused to move along the same direction, resulting in a change in the focus position, i.e., the in-focus position.

It is to be noted that the AF lens group 241 and the second lens group 251 do not interfere with each other in the extended state, regardless of the focal length or the in-focus position.

—Transitioning from the Extended State to the Contracted State—

Next, a contracting operation of the interchangeable lens barrel 200 will be explained. As the zooming ring 205 is rotated along a predetermined direction while pressing down on the retract release button 204 shown in FIG. 1 in order to switch from the extended state to the contracted state, the first lens group chamber 220 and the STM mounting tube 230 in FIG. 2 move toward the second lens group chamber 250 respectively through the first cam groove 212a and through the second cam groove 212b. It is to be noted that when the STM mounting tube 230 moves, the AF lens group chamber 240 linked to the AF stepping motor 270 mounted at the STM mounting tube 230, too, moves together with the STM mounting tube 230.

As the zooming ring 205 is further rotated along the predetermined direction while pressing down on the retract release button 204, the first lens group chamber 220 alone moves by a predetermined extent along the same direction while the STM mounting tube 230 remains in a stationary state and the contracting operation then ends. The interchangeable lens barrel 200 thus enters the contracted state shown in FIG. 7. It is to be noted that once the STM mounting tube 230 becomes stationary, the AF lens group chamber 240 linked to the AF stepping motor 270, too, comes to a stop.

Figure 7:
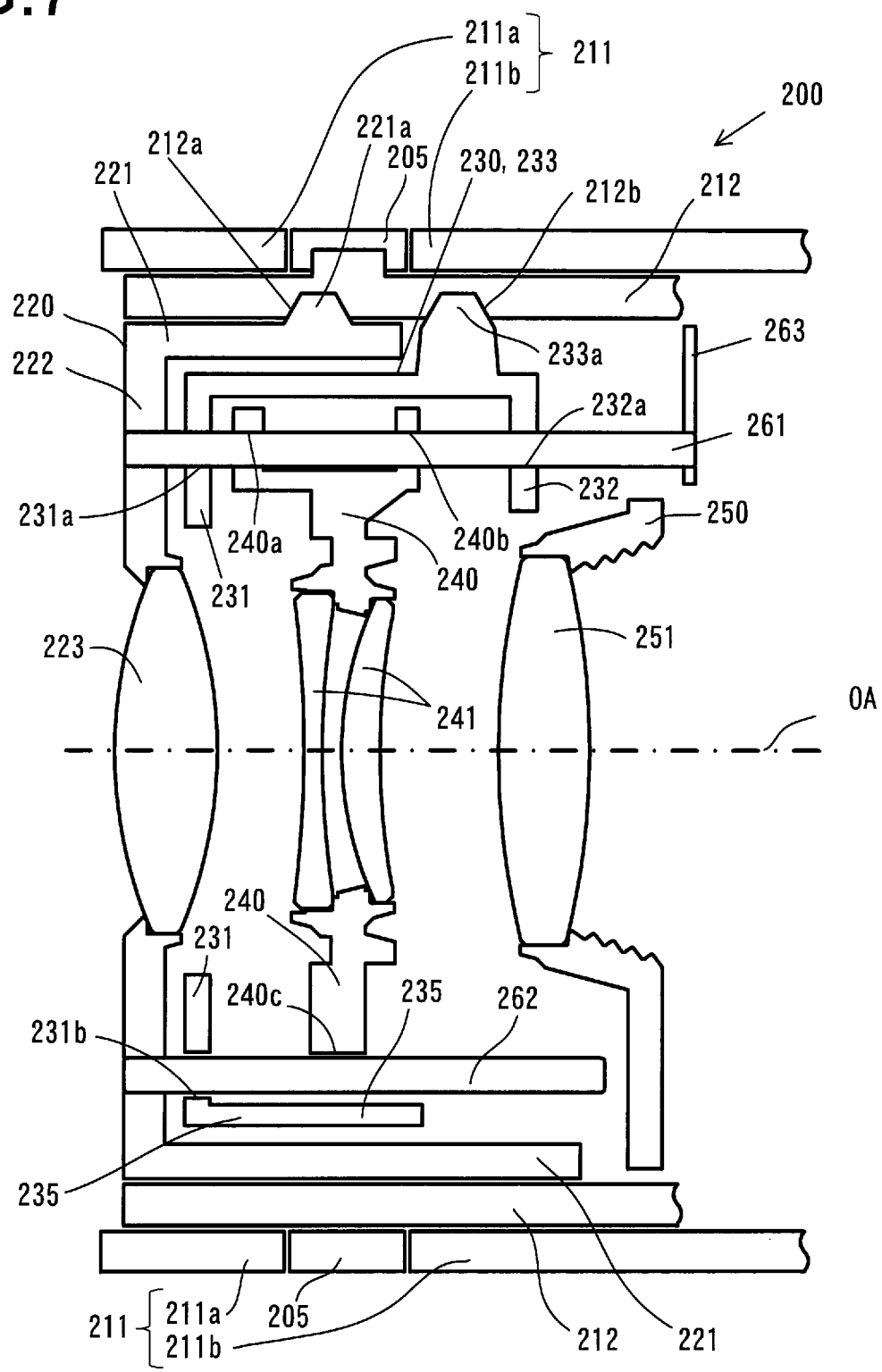

At the interchangeable lens barrel 200 in the contracted state shown in FIG. 7, the distance between the lens holding portion 222 in the first lens group chamber 220 and the first guide plate 231 at the STM mounting tube 230 is smaller compared to the corresponding distance assumed in the extended state. In addition, the distance between the lens holding portion 222 in the first lens group chamber 220 and the second lens group chamber 250 is smaller than the corresponding distance assumed in the extended state. In this condition, the first lens group chamber 220 is housed inside the fixed tube 211.

It is to be noted that the AF lens group 241 and the second lens group 251 do not interfere with each other in the contracted state regardless of the position taken by the AF lens group 241.

—Transitioning from the Contracted State to the Extended State—

Next, an extending operation of the interchangeable lens barrel 200 will be explained. As the zooming ring 205 is rotated along a direction opposite from the direction in which it is rotated for the contracting operation while pressing down on the retract release button 204 shown in FIG. 1 so as to switch from the contracted state to the extended state, the first lens group chamber 220 shown in FIG. 7 moves along a direction opposite from that taken for the contracting operation, i.e., along a direction moving away from the second lens group chamber 250, and as a result, the extended state shown in FIG. 2 or FIG. 3 is resumed.

The following advantages and operations are achieved through the first embodiment described above.

(1) The interchangeable lens barrel 200 includes the AF lens group chamber 240 that holds the AF lens group 241, the AF stepping motor 270 linked to the AF lens group chamber 240, which drives the AF lens group chamber 240 along the direction of the optical axis OA, the STM mounting tube 230 at which the AF stepping motor 270 is mounted, and the main guide bar 261 that guides the AF lens group chamber 240 and the STM mounting tube 230 so as to allow them to move along the optical axis OA.

Since a structure that allows the AF lens group chamber 240, driven by the AF stepping motor 270, and the STM mounting tube 230, at which the AF stepping motor 270 is mounted, to both move along the optical axis OA as they are guided by the same main guide bar 261, the state of interlock between the lead screw 271 and the rack portion 242 is stabilized, which, in turn, makes it possible to stabilize the focus control accuracy.

(2) The interchangeable lens barrel 200 includes the first lens group chamber 220 to which the main guide bar 261 is fixed. The first lens group chamber 220 moves along the optical axis OA during a zooming operation. Thus, the AF lens group chamber 240 and the STM mounting tube 230 are allowed to move with high accuracy along the optical axis OA relative to the first lens group chamber 220.

(3) The interchangeable lens barrel 200 further includes the cam barrel 212 that rotates around the optical axis OA set at the rotational center thereof during a zooming operation. The first lens group chamber 220 holds the first lens group 223 which is included in the interchangeable lens barrel 200. The STM mounting tube 230 includes the cam follower 233a, which is caused to move, via the cam barrel 212, along the optical axis OA, whereas the first lens group chamber 220 includes the cam follower 221a, which is caused to move, via the cam barrel 212, along the optical axis OA.

Since these structural features make it possible to set the first lens group chamber 220 and the STM mounting tube 230 closer to each other through the contracting operation, the lens barrel length L in the contracted state can be reduced. Consequently, miniaturization of the interchangeable lens barrel 200 can be achieved.

(4) The interchangeable lens barrel 200 further includes the first lens group chamber 220, to which the main guide bar 261 is fixed, and the cam barrel 212 that is caused to rotate around the optical axis OA set at the rotational center thereof during a zooming operation. The main guide bar 261 includes a shaft member extending along the optical axis OA. The first lens group chamber 220 includes the lens holding portion 222, to which one end of the main guide bar 261 is fixed, the tube portion 221 and the main guide bar adjustment plate 263, to which the other end of the main guide bar 261 is fixed. The tube portion 221 assumes a cylindrical shape centered on the optical axis OA, with the STM mounting tube 230 disposed on the inner circumferential side thereof. The main guide bar adjustment plate 263 is a plate member disposed along a direction substantially perpendicular to the optical axis OA, and is fixed to the tube portion 221.

These structural features make it possible to optimally adjust the direction along which the AF lens group 241 moves relative to the first lens group 223 during a magnification adjustment operation and a focusing operation, which ultimately makes it possible to improve the optical performance of the interchangeable lens barrel 200.

(5) The interchangeable lens barrel 200 further includes the cam barrel 212 that reduces the overall length of the interchangeable lens barrel 200 by moving, at least, the first lens group chamber 220 along the optical axis OA, and the cam follower 221a that fits in the first cam groove 212a at the cam barrel 212. The cam barrel 212 and the cam follower 221a, which fits in the first cam groove 212a at the cam barrel 212, cause the main guide bar 261 to move relative to the STM mounting tube 230 and the AF lens group chamber 240 as the first lens group chamber 220 moves along the optical axis OA.

The first lens group chamber 220 and the STM mounting tube 230 can thus be set closer to each other through the contracting operation and, as a result, the barrel length L in the contracted state can be reduced. In other words, miniaturization of the interchangeable lens barrel 200 can be achieved.

The following variations are also within the scope of the present invention, and one or more of the variations may be adopted in combination with the embodiment described above.

(Variation 1)

A DC motor or an ultrasonic motor may be used in place of the AF stepping motor 270. In addition, the first lens group 223, the AF lens group 241 and the second lens group 251 are not limited to those in the examples in the drawings and they may each include a greater or smaller number of lenses.

(Variation 2)

The camera system 1 according to the first embodiment as described above includes a telescopic interchangeable lens that assumes a smaller lens barrel length when the camera is not in use. The camera according to a variation of the first embodiment is a retractable-lens camera having a fixed lens barrel that cannot be detached from the camera body. The retractable-lens camera includes a mechanism whereby the lens barrel is partly or entirely housed inside the camera body when the camera is not in use and the lens barrel projects out of the camera body when the camera is in use.

Primary differences between the retractable-lens camera in variation 2 and the telescopic interchangeable lens barrel according to the embodiment described above are that the STM mounting tube 230, the AF lens group chamber 240, the second lens group chamber 250 and the like in FIG. 2 are built into the camera body in the retractable-lens camera, which does not include the fixed tube 211 or the cam barrel 212, and that the first lens group chamber 220 and the STM mounting tube 230 are individually driven along the optical axis via an actuator (not shown). It is to be noted that it may adopt a structure in which the first lens group chamber 220 and the STM mounting tube 230 are caused to move along the optical axis as the cam barrel 212 is driven by an actuator (not shown).

When the retractable-lens camera is in use, the first lens group chamber 220 projects out of the camera body and a zooming operation and a focusing operation are executed in this condition, in much the same way as in the telescopic interchangeable lens barrel 200 according to the embodiment described earlier.

During a retracting operation, the first lens group chamber 220 and the STM mounting tube 230 in the retractable-lens camera are caused to move toward the second lens group chamber 250 along the optical axis via an actuator (not shown). The STM mounting tube 230 stops at some point, but the first lens group chamber 220, driven via an actuator (not shown) continues to move closer to the STM mounting tube 230, so as to reduce the distance between the lens holding portion 222 and the first guide plate 231 at the STM mounting tube 230. As a result, the first lens group chamber 220, having projected out of the camera body while the camera is in use, enters a retracted state (or a collapsed state), in which the extent to which it projects out is reduced or the extent of projection becomes substantially equal to zero.

(Variation 3)

While the second lens group chamber 250 is fixed in the embodiment described above, it may instead be configured so as to be allowed to move along the optical axis OA.

(Variation 4)

While the left side is designated as the subject side and the right side is designated as the image sensor side in FIGS. 2, 3 and 7, in reference to which the embodiment has been explained, the left side and the right side may instead be respectively designated as the image sensor side and the subject side.

(Variation 5)

In the embodiment described above, the rack portion 242 is mounted at the AF lens group chamber 240. The rack portion 242 is threaded so as to interlock with the lead screw 271 of the AF stepping motor 270. As an alternative, a threaded nut portion, which interlocks with the lead screw 271, may be disposed in the AF lens group chamber 240 in place of the rack portion 242.

The first embodiment of the present invention described above also includes the following aspects.

(1) The lens barrel in a first aspect comprises a first lens holding member that holds a first lens, a drive source linked to the first lens holding member, which drives the first lens holding member along an optical axis, a mounting member at which the drive source is mounted, and a guide member that guides the first lens holding member and the mounting member so as to allow them to move along the optical axis.

(2) In a second aspect, the lens barrel in the first aspect includes a fixing member to which the guide member is fixed and the fixing member moves along the optical axis during a zooming operation.

(3) In a third aspect, the lens barrel in the second aspect further includes a cam barrel that rotates around the optical axis set at a rotational center thereof during a zooming operation, the fixing member holds another lens included in the lens barrel, the mounting member includes a mounting member cam follower that is caused to move along the optical axis via the cam barrel, and the fixing member includes a fixing member cam follower that is caused to move along the optical axis via the cam barrel.

(4) In a fourth mode, the lens barrel in any one of the first through third aspects further includes a fixing member to which the guide member is fixed and a cam barrel that rotates around the optical axis set at the rotational center thereof during a zooming operation, the guide member includes a shaft member extending along the optical axis, the fixing member includes a first fixing member to which one end of the shaft member is fixed and a second fixing member to which another end of the shaft member is fixed, the first fixing member assumes a cylindrical shape centered on the optical axis, the mounting member is disposed on the inner circumferential side thereof, and the second fixing member, which is a plate member disposed along a direction substantially perpendicular to the optical axis, is fixed relative to the first fixing member.

(5) In a fifth mode, the lens barrel in any one of the first through fourth aspects further includes a fixing member to which the guide member is fixed and a cam barrel that rotates around the optical axis set at the rotational center thereof during a zooming operation, the mounting member includes a mounting member cam follower that is caused to move along the optical axis via the cam barrel, and the mounting member moves along the optical axis as it is guided by the guide member along the optical axis and the cam barrel is engaged with the mounting member cam follower.

(6) In a sixth aspect, the lens barrel in any one of the second through fifth aspects further includes a retraction mechanism for reducing the overall length of the lens barrel by moving at least the fixing member along the optical axis, and the retraction mechanism causes the guide member to move relative to the mounting member and the first lens holding member as the fixing member moves along the optical axis.

(7) An optical device in a seventh aspect includes the lens barrel in any one of the first through sixth aspects.

Second Embodiment

In reference to FIGS. 8 through 17, the second embodiment of the lens barrel will be described.

Figure 8:
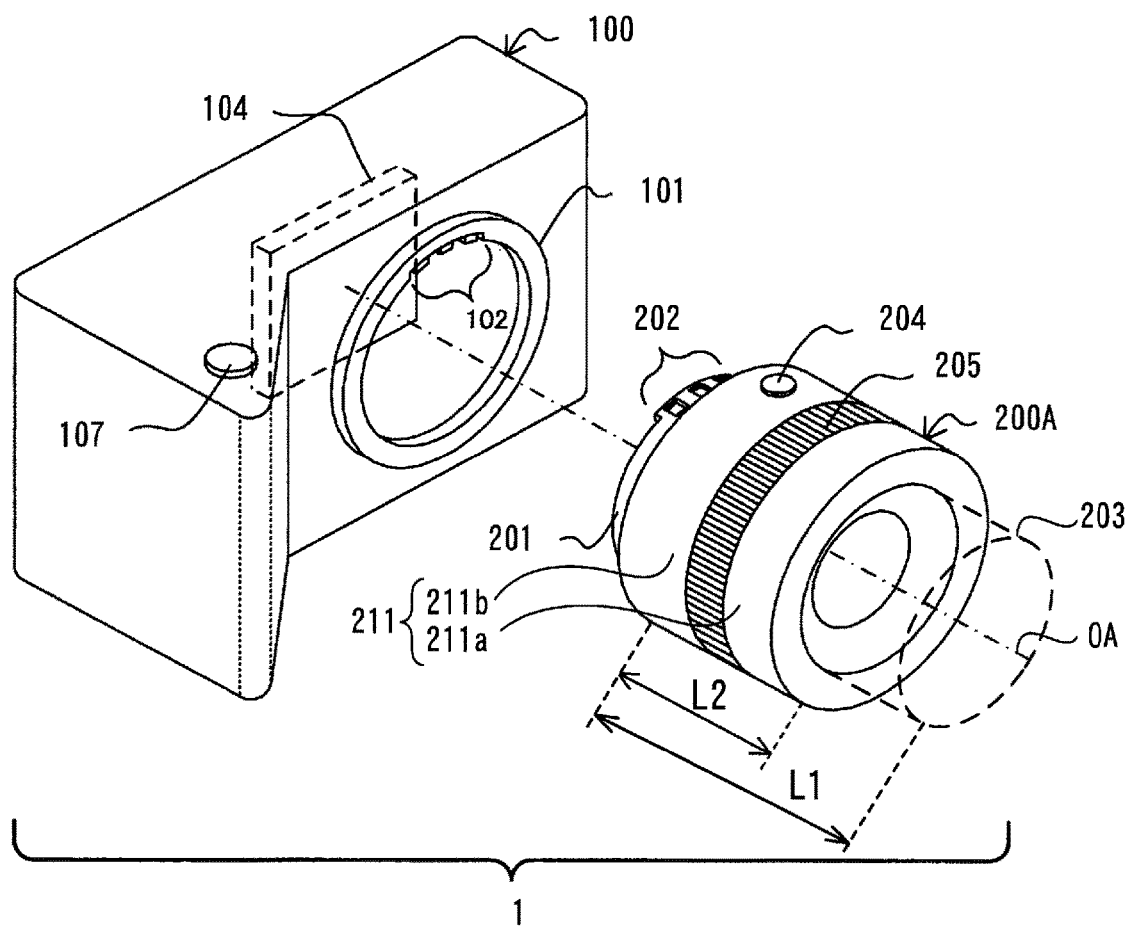

FIG. 8 shows, in a perspective, a camera system of an interchangeable-lens type, having the lens barrel according to the embodiment included as an interchangeable lens thereof. A camera system 1 includes a camera body 100 and an interchangeable lens barrel 200A that can be detachably mounted at the camera body 100.

A body-side lens mount 101, at which the interchangeable lens barrel 200 is detachably mounted, is disposed at the camera body 100. A lens-side lens mount 201, corresponding to the body-side lens mount 101, at which the camera body 100 is detachably mounted, is disposed at the interchangeable lens barrel 200A. As the interchangeable lens barrel 200A is mounted at the camera body 100, a contact group 102, which is located on the body-side lens mount 101 and is made up with a plurality of contacts, becomes connected with a contact group 202, which is disposed on the lens-side lens mount 201 and is made up with a plurality of contacts. The contact groups 102 and 202 are used to provide power from the camera body 100 to the interchangeable lens barrel 200A and to enable signal exchange between the camera body 100 and the interchangeable lens barrel 200A.

An image sensor 104, which captures a subject image and outputs image capturing signals, is disposed inside the camera body 100 further rearward relative to the body-side lens mount 101. At the top of the camera body 100, a button 107, used as an input device, is disposed. The user is able to issue a photographing instruction, a photographing condition setting instruction and the like to the camera body 100 via the button 107.

The interchangeable lens barrel 200A in the embodiment includes a fixed tube 211 constituted with first and second tubular members 211a and 211b, which cover the outer circumferential area of the interchangeable lens barrel 200A, and a zooming ring 205 disposed between the first tubular member 211a and the second tubular member 211b. The interchangeable lens barrel 200A is a lens barrel generally known as a manual zooming lens with a variable focal length that can be manually adjusted by the user by operating the zooming ring 205. As the user rotates the zooming ring 205, the focal length of the interchangeable lens barrel 200A continuously changes toward a wide angle side or toward a telephoto side. In other words, the focal length of the interchangeable lens barrel 200A can be freely selected between the telephoto-end position and the wide-angle-end position by operating the zooming ring 205.

In addition, as will be described in detail later, the interchangeable lens barrel 200A is a telescopic lens barrel, which may assume an extended state with a lens inner barrel 203 that holds the entirety of, or part of, a photographic optical system extending from the fixed tube 211 or a contracted state with the lens inner barrel housed inside the fixed tube 211. It is to be noted that the lens inner barrel 203 in the extended state is indicated with a dotted line in FIG. 8.

The interchangeable lens barrel 200A is switched from the extended state to the contracted state and vice versa by operating a retract release button 204 and the zooming ring 205. Namely, the interchangeable lens barrel 200A in the extended state has its inner barrel 203 extended, i.e., projecting out from the fixed tube 211, and a barrel length L of the interchangeable lens barrel 200A in this state is thus L1. Via the interchangeable lens barrel 200A in the extended state, a good subject image can be formed at the image sensor 104 and the camera system 1 is in a photographing-enabled state. In order to switch from the extended state to the contracted state, the zooming ring 205 is rotated further toward the wide-angle side beyond the rotational position for adjusting the focal length of the lens to the wide-angle end, while pressing down on the retract release button 204. In response to this supplemental rotating operation, the inner barrel 203 becomes housed into the inner circumference of the fixed tube 211, thereby setting the interchangeable lens barrel 200A in the contracted state. A lens barrel length L2 in the contracted state is smaller than the lens barrel length L1 in the extended state and the camera system 1 is in a photographing-disabled state. When the focal length of the interchangeable lens barrel 200A is set between the wide angle end and the telephoto end, the zooming ring 205 cannot be rotated to a rotational angle position beyond the wide-angle end or the telephoto end, unless the retract release button 204 is being depressed while the zooming ring 205 is rotated. Namely, the retract release button 204 constitutes part of a structure fulfilling a mechanical lock function for physically preventing a transition from the extended state to the contracted state.

Once the interchangeable lens barrel 200A enters the contracted state, the zooming ring 205 cannot be rotated to a rotational angle position between the wide-angle end and the telephoto end unless the retract release button 204 is simultaneously depressed. In other words, the retract release button 204 constitutes part of a structure fulfilling a mechanical lock function for physically preventing a transition from the contracted state to the extended state.

As described above, the user must rotate the zooming ring 205, set at the rotational position corresponding to the wide-angle end, further toward an even greater rotational angle position while pressing down on the retract release button 204 in order to switch the interchangeable lens barrel 200A in the extended state to the contracted state. In addition, the user wishing to switch the interchangeable lens barrel 200A in the contracted state to the extended state must rotate the zooming ring 205 to a rotational angle position between the wide-angle end and the telephoto end while pressing down on the retract release button 204.

Figure 9:
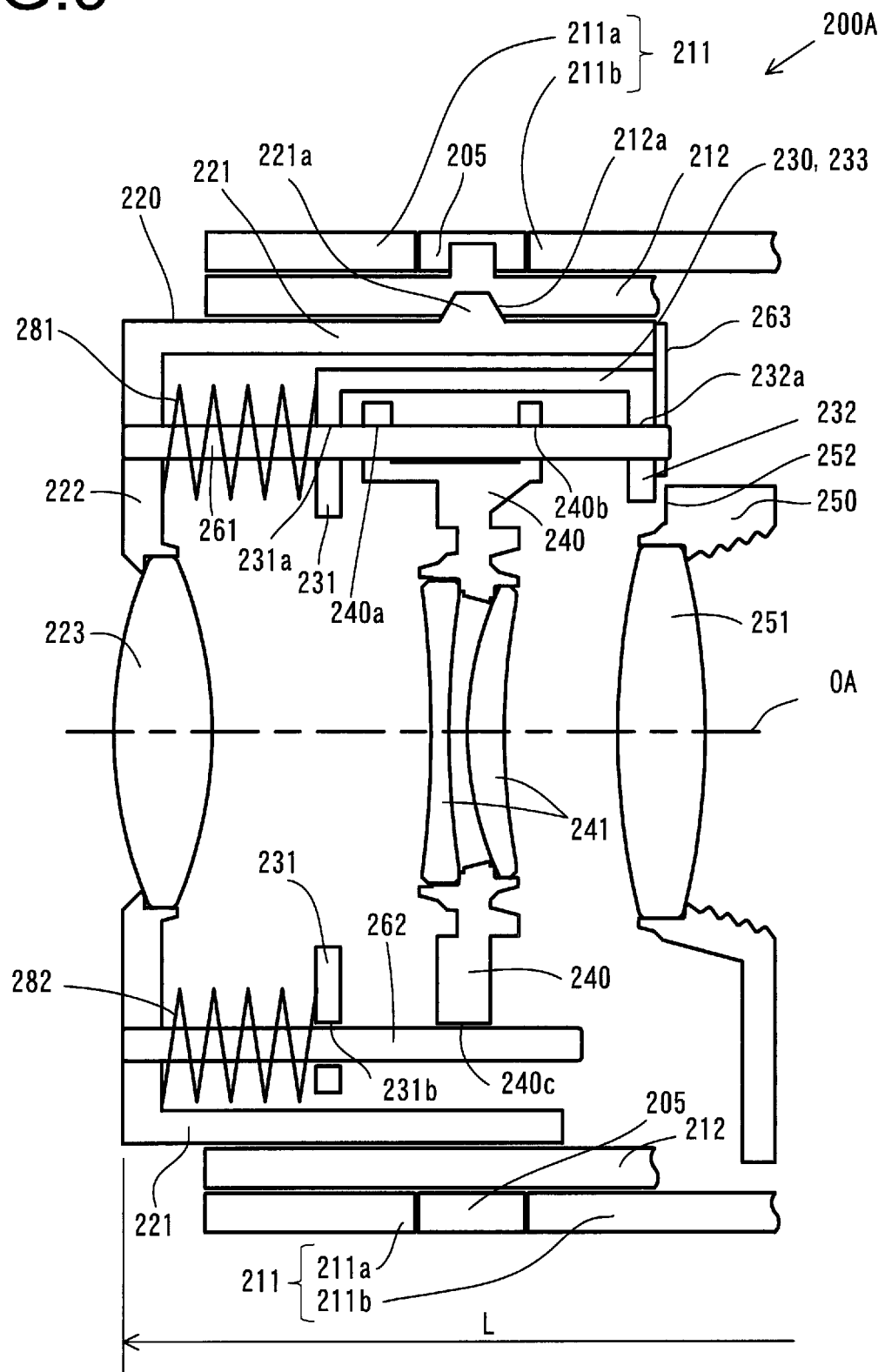
Figure 10:
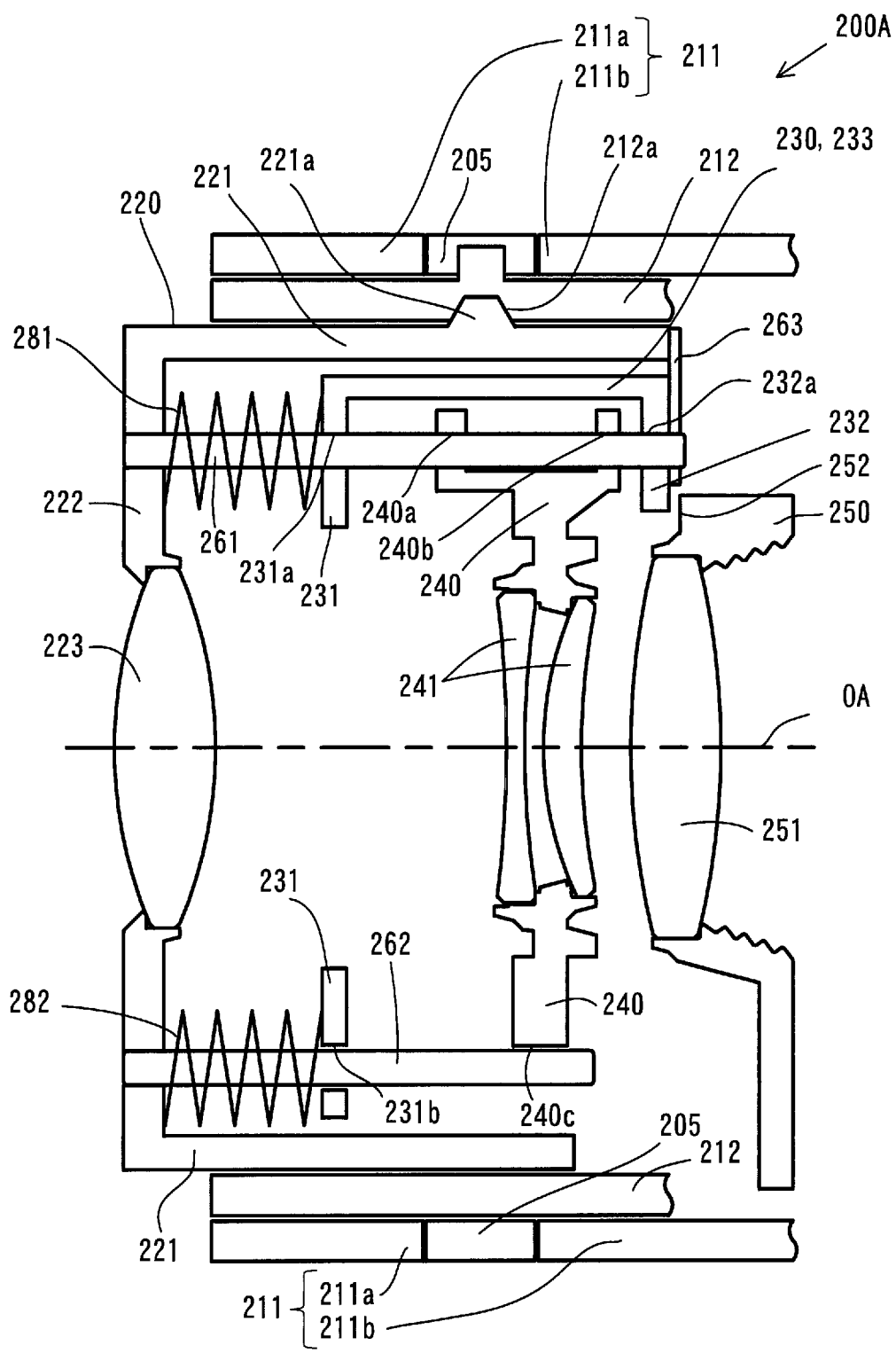
Figure 11:
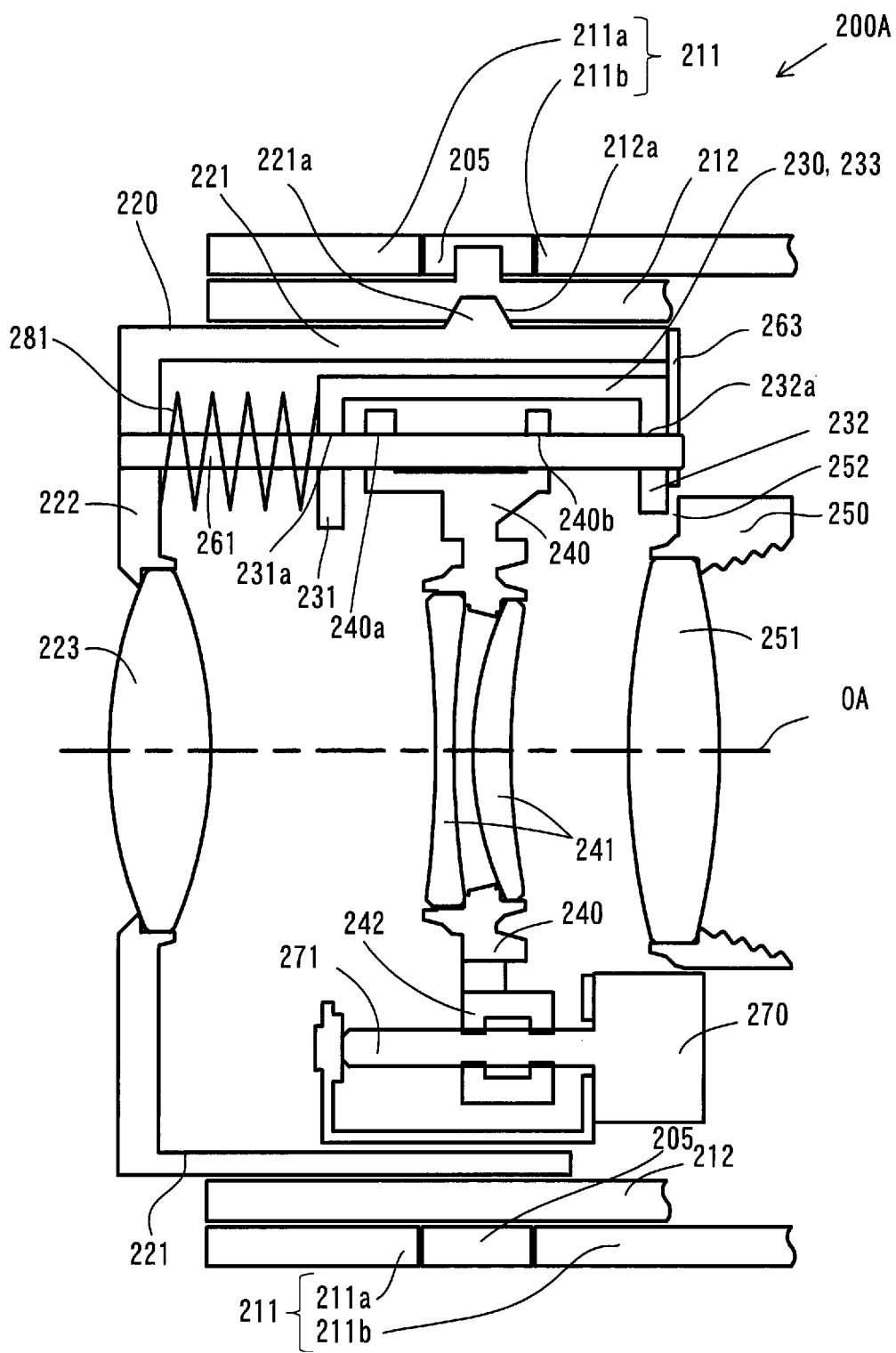
Figure 12:
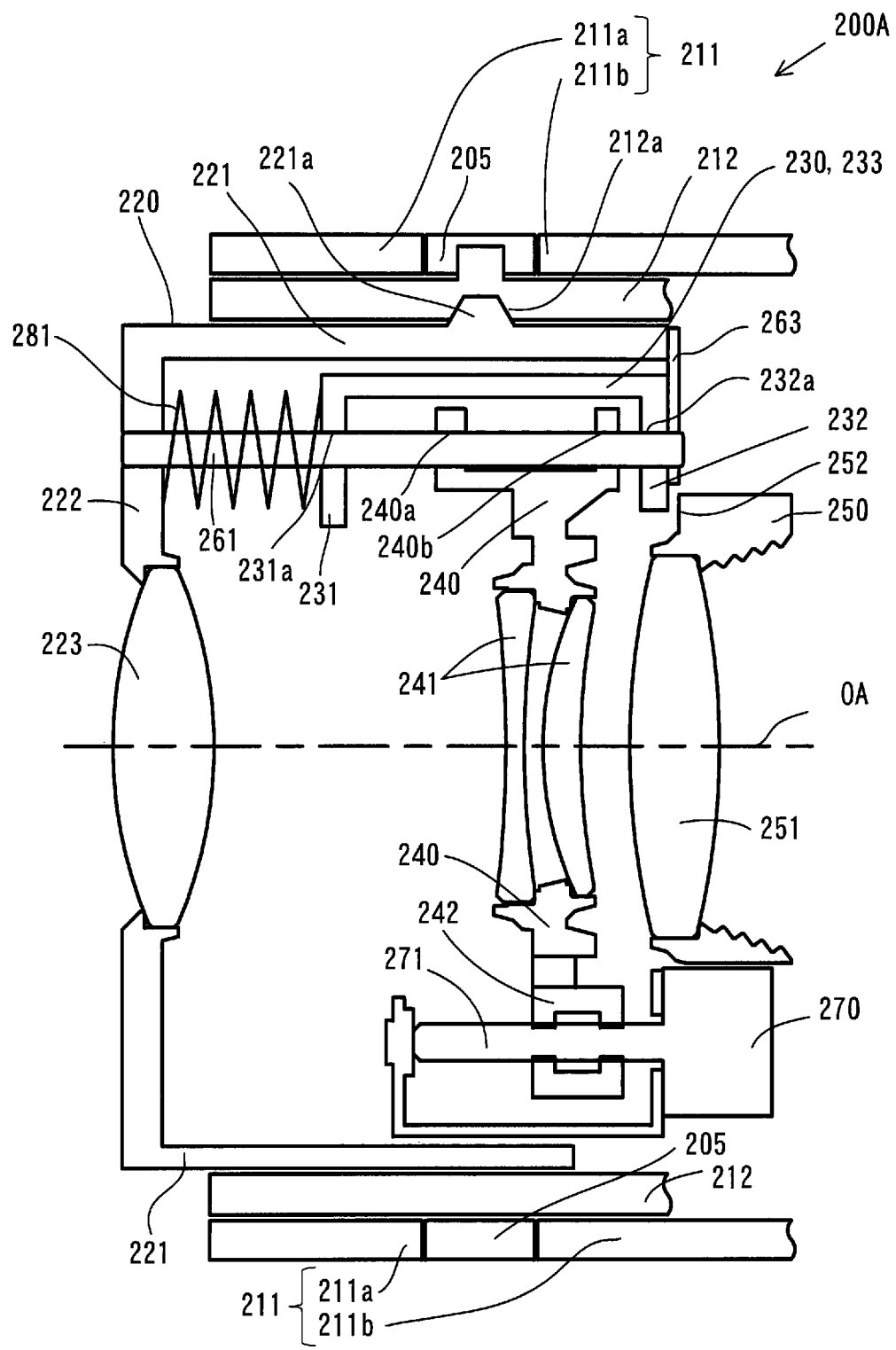
Figure 13:
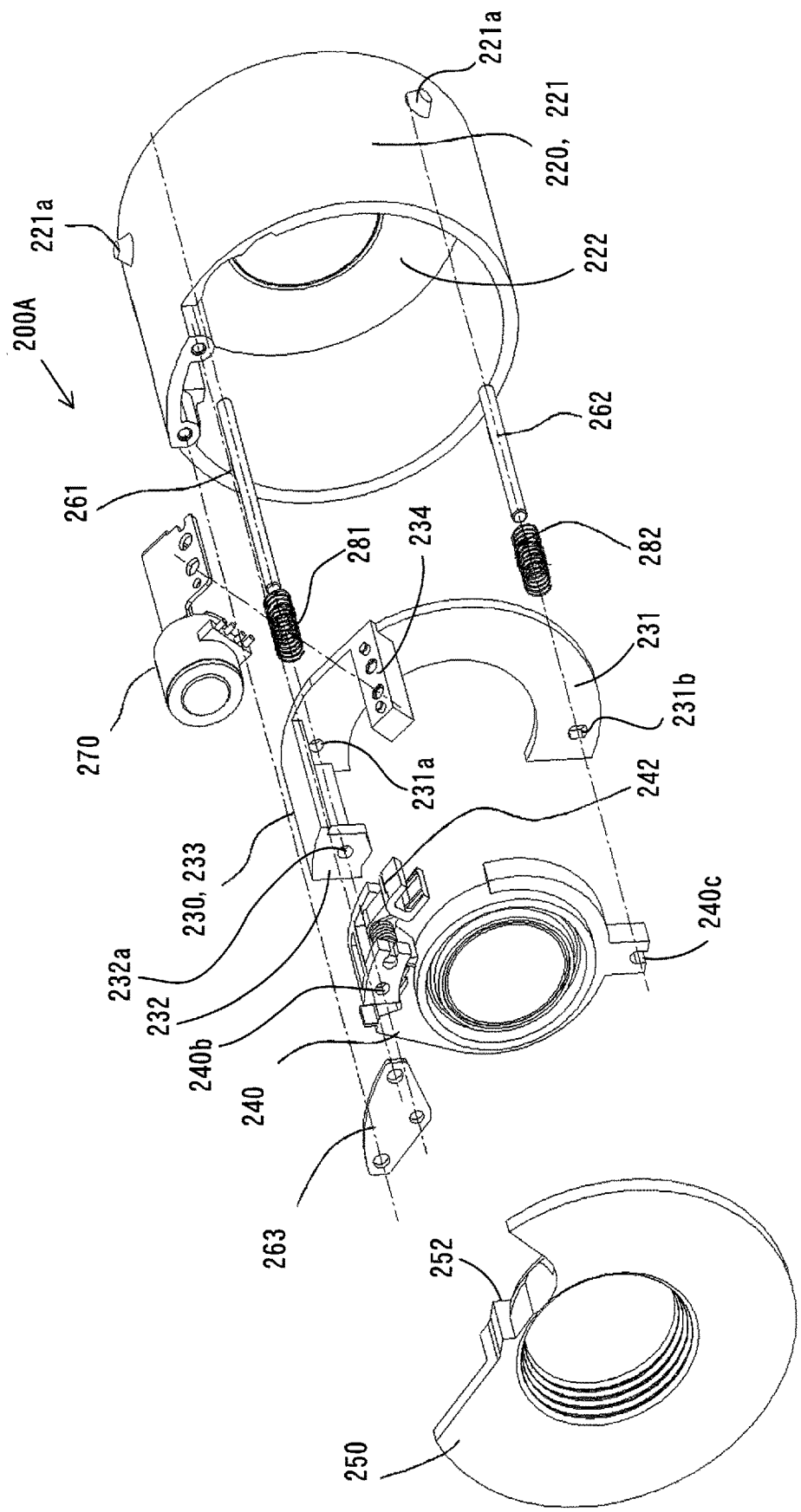
Figure 14:
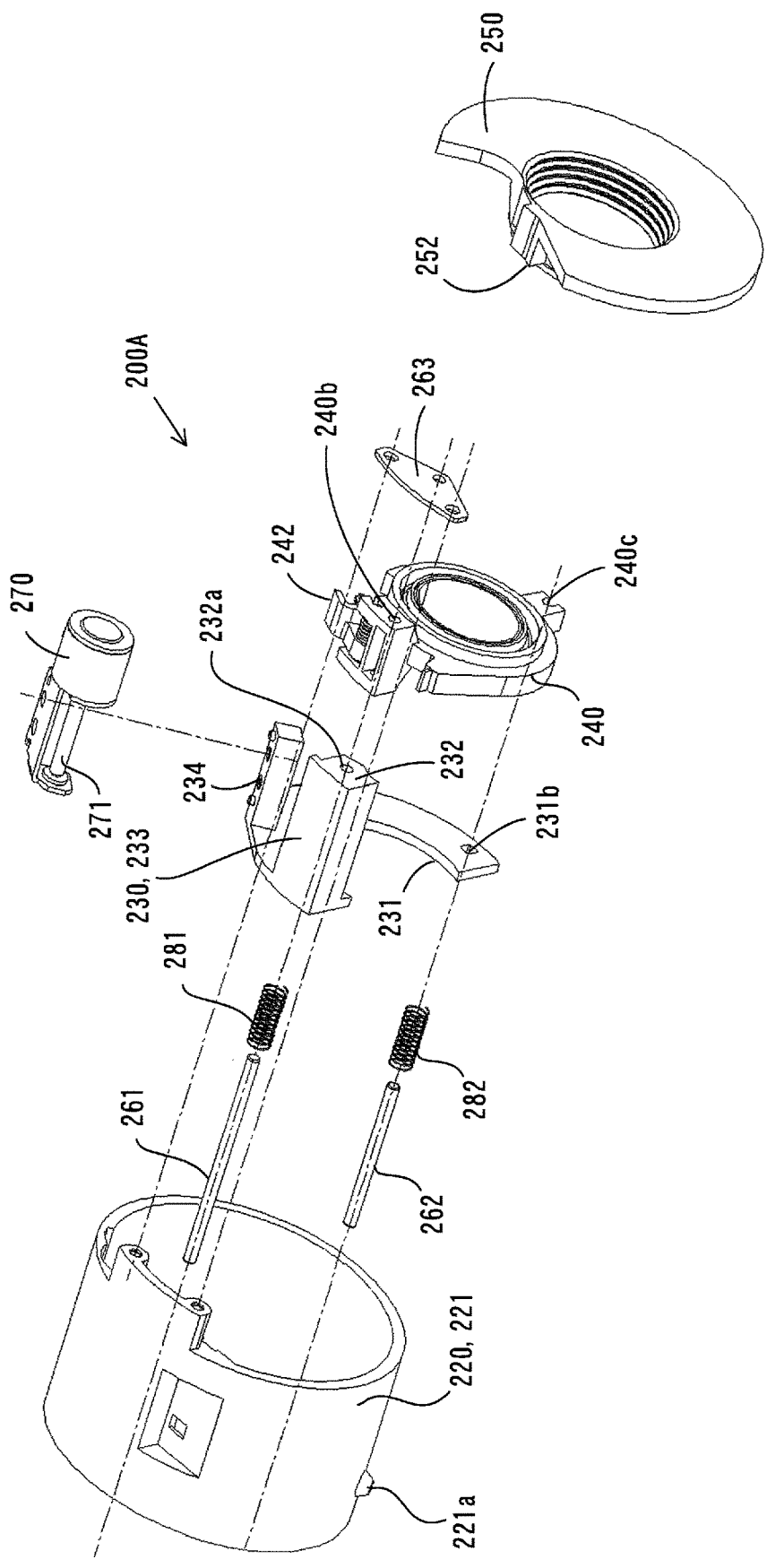
Figure 15:
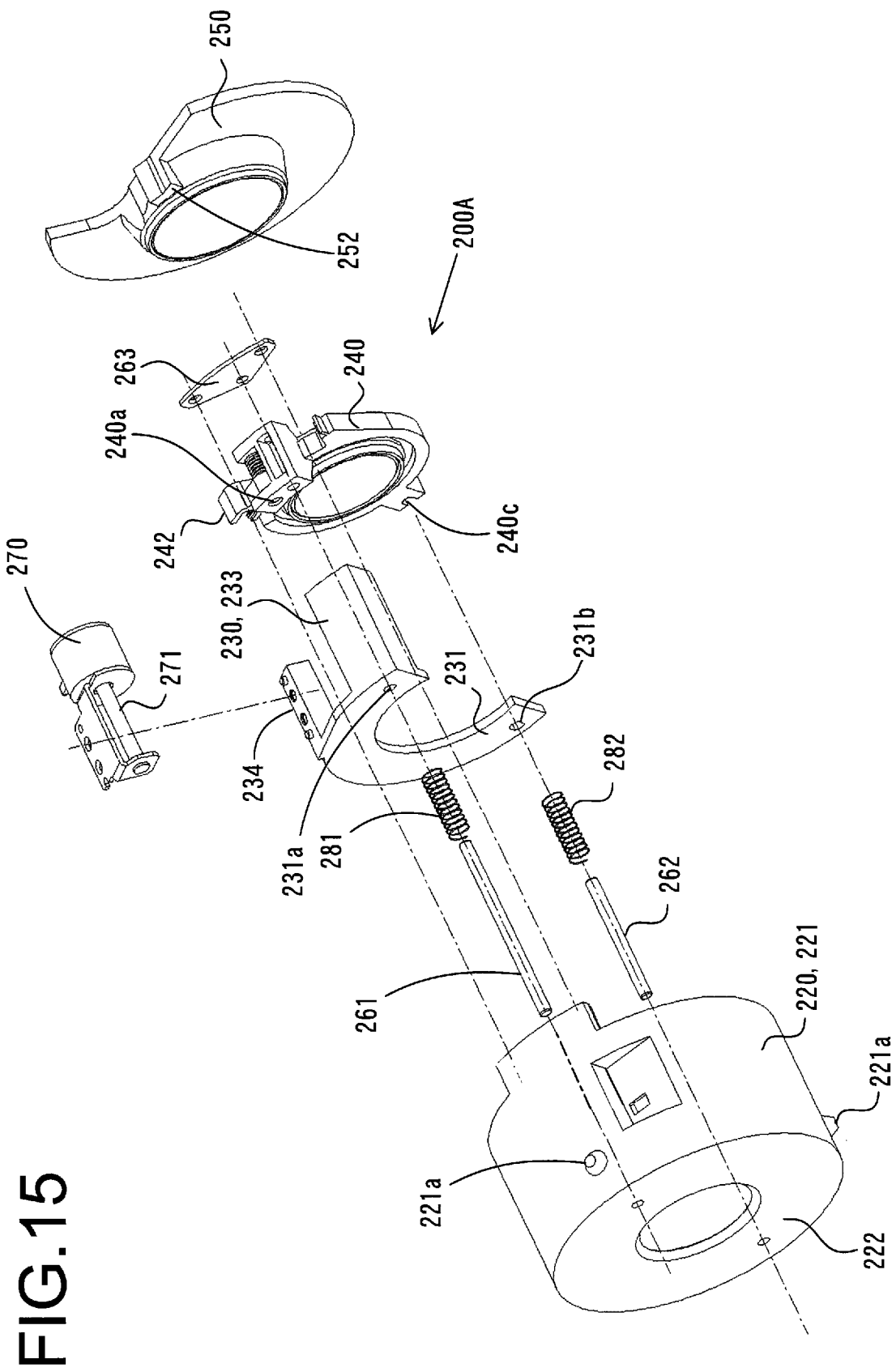

FIGS. 9 through 12 each show part of the interchangeable lens barrel 200A in the extended state in a sectional view. FIGS. 9 and 10 are sectional views that include a main guide bar 261 and a sub guide bar 262, whereas FIGS. 11 and 12 are sectional views that include the main guide bar 261 and an AF stepping motor 270. It is to be noted that FIGS. 9 and 11 each illustrate a condition in which an AF lens group lens 241 has moved to a position achieving an in-focus state at the infinity focal length, whereas FIGS. 10 and 12 each illustrate a condition in which the AF lens group 241 has moved to a position achieving an in-focus state at a close-up focal length. FIGS. 13 through 15 each show part of the interchangeable lens barrel 200a in an exploded view.

As FIGS. 9 through 12 show, the interchangeable lens barrel 200A includes the fixed tube 211, the zooming ring 205, a cam barrel 212 that fits into the inner circumference of the fixed tube 211, a first lens group chamber 220 that fits into the inner circumference of the cam barrel 212, a stepping motor (STM) mounting tube 230, an AF lens group chamber 240 and a second lens group chamber 250.

In the embodiment, the first lens group chamber 220 is equivalent to the inner barrel 203 in FIG. 8, which projects out, i.e., extends, from the fixed tube 211 toward the subject side in the extended state. In addition, the left side is designated as the subject side and the right side is designated as the image sensor side in FIGS. 9 through 12 and 14 through 17. The right side is designated as the subject side and the left side is designated as the image sensor side in FIG. 13. It is to be noted that another lens may be present further toward the subject side relative to the first lens group chamber 220. In addition, another lens may be present further toward the image sensor side relative to the second lens group chamber 250.

As shown in FIGS. 9 and 13, the zooming ring 205 is disposed between the first tubular member 211a and the second tubular member 211b of the fixed tube 211, as has been explained earlier, and the zooming ring 205 can be rotated relative to the first tubular member 211a and the second tubular member 211b. The zooming ring 205 is engaged with the cam barrel 212 via a rectilinear key so as to enable rotation with the cam barrel 212 and relative movement in a rectilinear manner.

A cam groove 212a is formed on the inner circumferential side of the cam barrel 212, which is caused to rotate as the zooming ring 205 shown in FIG. 8 is rotated.

As shown in FIGS. 9 and 13, the first lens group chamber 220 includes a cylindrical tube portion 221 and a lens holding portion 222 assuming a hollow disk shape, which holds a first lens group 223 at the subject side of the tube portion 221. The lens holding portion 222 is fixed to the subject-side end of the tube portion 221. At the outer circumference of the tube portion 221, a cam follower 221a that fits in the cam groove 212a at the cam barrel 212 is disposed. The rotation of the tube portion 221 around the optical axis is regulated by a rectilinear guide member (not shown), and as the cam barrel 212 rotates, the tube portion 221 is caused to move rectilinearly along the optical axis due to the engagement between the cam follower 221a and the cam groove 212a and the guidance by the rectilinear guide member.

The main guide bar 261 and the sub guide bar 262, which guide the STM mounting tube 230 and the AF lens group chamber 240 along the optical axis OA, are mounted at the lens holding portion 222. The main guide bar 261 and the sub guide bar 262, which are members each assuming the shape of a shaft disposed so as to range along the optical axis OA, are disposed near positions that face opposite each other across the optical axis OA, with their subject-side ends attached to the lens holding portion 222, each ranging toward the image sensor along the optical axis OA (see FIGS. 13 through 15). As shown in FIG. 9, a main guide bar adjustment plate 263, which is a plate disposed along a direction perpendicular to the optical axis OA, is mounted at the right end of the tube portion 221, i.e., at the end located toward the image sensor side, in the first lens group chamber 220. The end of the main guide bar 261 located toward the image sensor side is attached to the main guide bar adjustment plate 263. At the main guide bar adjustment plate 263, a main guide bar fixing hole, in which the end of the main guide bar 261 is fixed, and screw holes for fixing the main guide bar adjustment plate 263 to the tube portion 221, are formed. The main guide bar adjustment plate 263, viewed from the direction along which the optical axis OA extends, takes a substantially triangular shape, with one side of the triangle located on the outer circumferential side curving in a circular arc along the outer circumferential surface of the tube portion 221. One end of the main guide bar 261 is supported by the lens holding portion 222, whereas the other end of the main guide bar 261 is supported by the main guide bar adjustment plate 263. The angle of the main guide bar 261 relative to the optical axis OA can be adjusted by adjusting the position at which the main guide bar adjustment plate 263 is mounted at the tube portion 221. In addition, the end of the sub sidebar 262 located toward the image sensor side is not supported, i.e., not fixed.

The STM mounting tube 230 is a member held via the main guide bar 261 and the sub guide bar 262 so that it is allowed to move along the optical axis OA inside the first lens group chamber 220, and the AF stepping motor 270 is mounted at the STM mounting tube 230, as shown in FIGS. 13 through 15. As shown in FIGS. 9 and 13, the STM mounting tube 230 includes first and second guide plates 231 and 232 set apart from each other along the optical axis OA, a linking portion 233 that links the first guide plate 231 and the second guide plate 232 with each other, and an STM mounting portion 234 fixed to the first guide plate 231. The AF stepping motor 270 is fixed to the STM mounting portion 234 via a screw or the like. At the first guide plate 231, an insertion hole 231a, in which the main guide bar 261 is inserted, and an insertion hole 231b, in which the sub guide bar 262 is inserted, are formed. In addition, an insertion hole 232a, in which the main guide bar 261 is inserted, is formed at the second guide plate 232. Viewed from the direction of the optical axis OA, the insertion holes 231a and 232a each assume a round shape, substantially matching the shape of the outer circumferential surface of the main guide bar 261. Viewed from the direction of the optical axis OA, the insertion hole 231b takes an elliptical shape or a U-shape ranging along the normal vector of a circle centered on the optical axis OA, and the insertion hole 231b contacts the outer circumferential surface of the sub guide bar 262 at two points. Thus, the STM mounting tube 230 is fitted so as to be allowed to move rectilinearly along the main guide bar 261 and, at the same time, rotation centered on the sub guide bar 262 over a plane perpendicular to the optical axis is disallowed by the sub guide bar 262.

The STM mounting tube 230, which is allowed to slide against the main guide bar 261 and the sub guide bar 262 along the optical axis OA, is guided by the main guide bar 261 and the sub guide bar 262 so that it moves relative to the first lens group chamber 220 along the optical axis OA.

Figure 16:
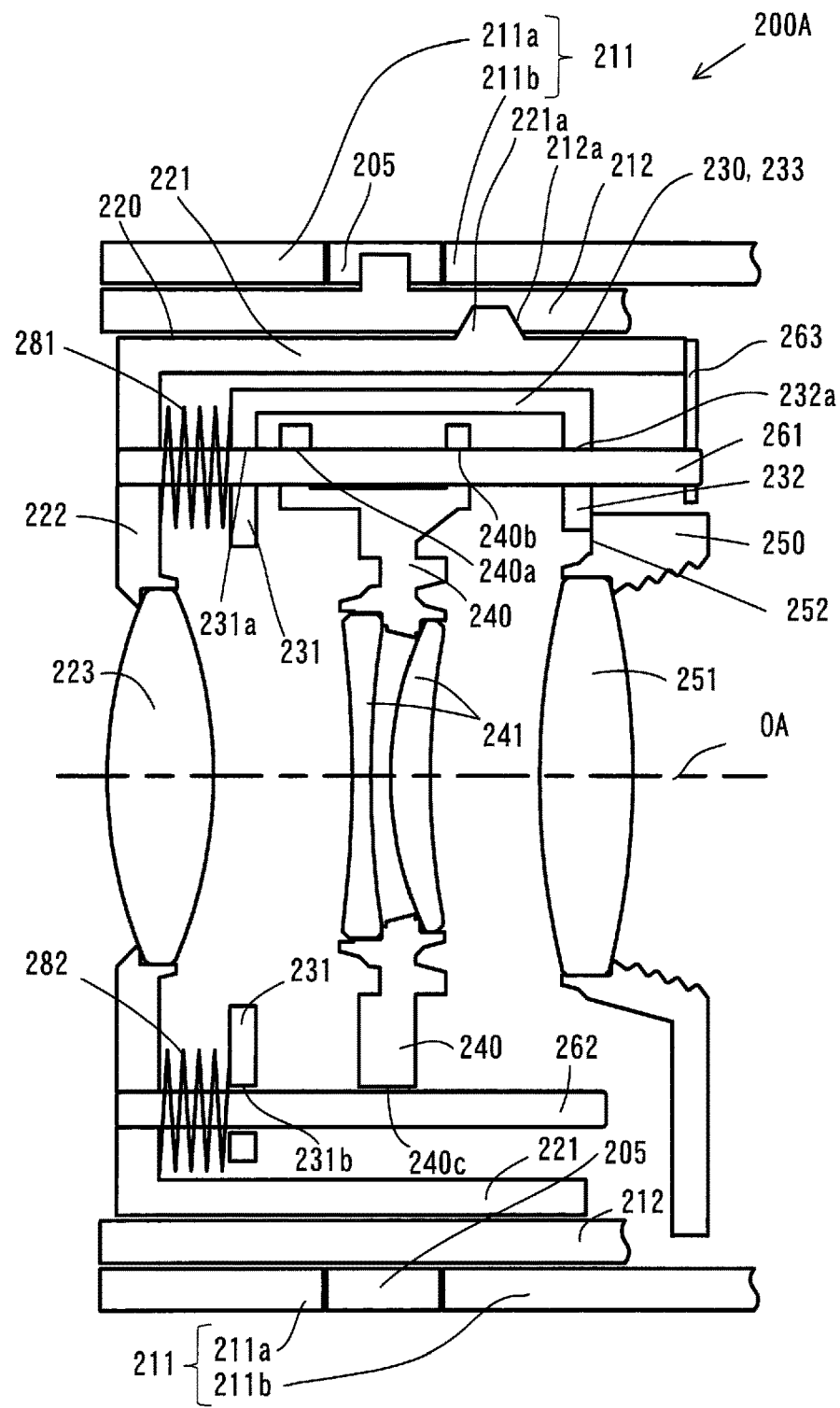
Figure 17:
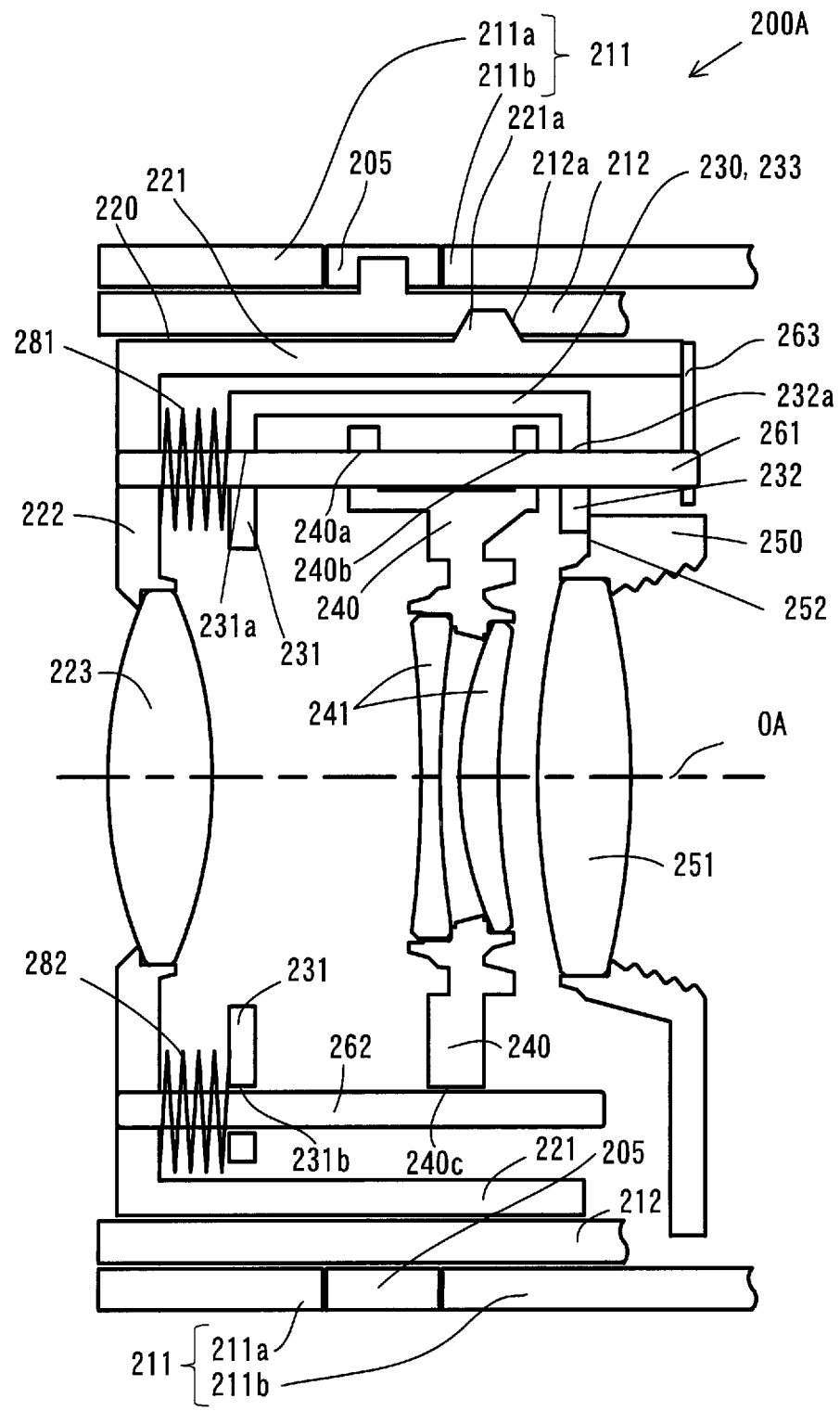

As shown in FIG. 9, the second lens group chamber 250 is disposed further toward the image sensor side relative to the first lens group chamber 220 and the STM mounting tube 230. The second lens group chamber 250 is a lens chamber where a second lens group 251 is held. The position taken by the second lens group chamber 250 along the optical axis within the interchangeable lens barrel 200A is fixed in the embodiment. The first lens group chamber 220, on the other hand, is allowed to move along the optical axis closer to the second lens group chamber 250 in the contracted state. As shown in FIGS. 16 and 17, the first lens group chamber 220 moves closer to the second lens group chamber 250 as a transition from the extended state to the contracted state occurs, and at least part of the second lens group chamber 250 assumes a position further toward the subject side relative to the main guide bar adjustment plate 263 located at the rear end of the first lens group chamber 220 in the contracted state. At the front end of the second lens group chamber 250, i.e., at the end of the second lens group chamber 250 located toward the subject side, a contact portion 252 is disposed that comes in contact with the rear end surface of the second guide plate 232 at the STM mounting tube 230, i.e., the end surface of the second guide plate 232 toward the image sensor side, in the contracted state, as will be explained later. As shown in FIGS. 9 through 12, the contact portion 252 is set apart from the rear end surface of the second guide plate 232 of the STM mounting tube 230 in the extended state.

As shown in FIG. 9, a coil spring 281 disposed coaxially with the main guide bar 261 and a coil spring 282 disposed coaxially with the sub guide bar 262 are present between the first guide plate 231 at the STM mounting tube 230 and the lens holding portion 222 at the first lens group chamber 220. Force is continuously imparted from the coil springs 281 and 282 along a direction in which the lens holding portion 222 and the first guide plate 231 move away from each other. With the force continuously imparted from the coil springs 281 and 282 as described above, the STM mounting tube 230 is set in contact with the main guide bar adjustment plate 263 at the first lens group chamber 220 or with the contact portion 252 at the second lens group chamber 250 and is thus stabilized.

A lead screw 271 is directly connected to an output shaft of the AF stepping motor 270, which is activated to rotationally drive the lead screw 271 at least for a focusing operation. The AF stepping motor 270 may also be activated for a zooming operation or a contracting/extending operation.

As shown in FIG. 9, the AF lens group chamber 240 holds the AF lens group 241, and the AF lens group chamber 240 in turn is held by the first lens group chamber 220 via the main guide bar 261 and the sub guide bar 262. It is to be noted that the AF lens group 241 constitutes a focusing lens that moves to achieve an in-focus state and also, together with the first lens group 223, constitutes a zooming lens. This means that the AF stepping motor 270 causes the AF lens group 241 alone to move along the optical axis OA for a focusing operation and to move along the optical axis OA together with the first lens group 223 for a zooming operation, as will be explained in detail later. It is to be noted that the AF lens group 241 does not need to constitute a focusing lens and instead may constitute a lens that moves for a zooming operation or for a contracting/extending operation.

At the AF lens group chamber 240, insertion holes 240a and 240b, at which the main guide bar 261 is inserted, and a semi-circular hole 240c, at which the sub guide bar 262 is inserted, are formed. The AF lens group chamber 240 is slidably guided by the main guide bar 261 and the sub guide bar 262 along the optical axis OA.

As shown in FIGS. 11 and 13, a rack portion 242 is mounted at the AF lens group chamber 240. The rack portion 242 is threaded so as to interlock with the lead screw 271 of the AF stepping motor 270. This means that the AF stepping motor 270 mounted at the STM mounting tube 230 and the AF lens group chamber 240 are linked with each other via the lead screw 271 and the rack portion 242 interlocking with each other. As the lead screw 271 at the AF stepping motor 270 is rotationally driven, the rack portion 242, interlocking with the lead screw 271, moves along the optical axis. Since the rack portion 242 is mounted at the AF lens group chamber 240 and the AF lens group chamber 240 is rectilinearly guided by the main guide bar 261 and the sub guide bar 262, the AF lens group chamber 240 also moves along the optical axis as the rack portion 242 moves along the optical axis.

It is to be noted that in the extended state, the STM mounting tube 230 is held by the coil springs 281 and 282 at a position in contact with the main guide bar adjustment plate 263, as explained earlier, and thus, the positions of the STM mounting tube 230 and the first lens group chamber 220 remain unchanged relative to each other. Accordingly, as the AF stepping motor 270 is driven for a focusing operation in the extended state, the AF lens group chamber 240 is driven along the optical axis OA relative to the first lens group 223 and the second lens group 251, which will be described later, between the infinity position shown in FIG. 11 and the close-up position shown in FIG. 12, so as to adjust the in-focus position.

—Operations of Various Components of the Interchangeable Lens Barrel 200A in the Extended State—

A zooming operation executed at the interchangeable lens barrel 200A will be explained first. As the zooming ring 205 is rotated, the cam barrel 212 rotates and thus, a magnification adjustment operation is executed with the first lens group chamber 220 and the STM mounting tube 230 moving as one along the optical axis OA at the interchangeable lens barrel 200A in the extended state shown in FIG. 9. Concurrently as the magnification adjustment operation is executed, the AF stepping motor 270 causes the AF lens group 241 to move relative to the STM mounting tube 230 along the optical axis OA, thereby preventing a fluctuation in the focus position.

Next, a focusing operation executed at the interchangeable lens barrel 200A will be explained. As the AF stepping motor 270 shown in FIG. 11 is driven at the interchangeable lens barrel 200A in the extended state, the AF lens group chamber 240 is driven along the optical axis OA relative to the STM mounting tube 230 as explained earlier. The positions taken by the STM mounting tube 230 and the first lens group chamber 220 relative to each other remain unchanged regardless of the rotational position of the zooming ring 205. Thus, as the AF stepping motor 270 is driven, the AF lens group chamber 240 is driven relative to the first lens group chamber 220 along the optical axis OA, resulting in a change in the relative distances, i.e., the distance between the AF lens group 241 and the first lens group 223 and the distance between the AF lens group 241 and the second lens group 251, thereby altering the in-focus position.

It is to be noted that the AF lens group 241 and the second lens group 251 do not interfere with each other in the extended state, or in the contracted state, regardless of the focal length or the in-focus position.

—Transitioning from the Extended State to the Contracted State—

Next, a contracting operation of the interchangeable lens barrel 200A will be explained. As the zooming ring 205 is rotated along a predetermined direction while pressing down on the retract release button 204 shown in FIG. 8 in order to switch from the extended state to the contracted state, the first lens group chamber 220 and the STM mounting tube 230 in FIG. 9 move as one toward the second lens group chamber 250 and eventually, the second guide plate 232 at the STM mounting tube 230 comes into contact with the contact portion 252 at the second lens group chamber 250. It is to be noted that when the STM mounting tube 230 moves as described above, the AF lens group chamber 240 linked to the AF stepping motor 270 mounted at the STM mounting tube 230 also moves.

Then, as the zooming ring 205 is further rotated along the predetermined direction while pressing down on the retract release button 204, the first lens group chamber 220 alone moves further along the same direction by a predetermined extent until the contracting operation is completed while the STM mounting tube 230 is held stationary through the contact between the second guide plate 232 and the contact portion 252 at the second lens group chamber 250. It is to be noted that once the STM mounting tube 230 becomes stationary, the AF lens group chamber 240 linked to the AF stepping motor 270, too, comes to a stop.

Once the contracting operation ends as described above, the distance between the lens holding portion 222 at the first lens group chamber 220 and the first guide plate 231 at the STM mounting tube 230 becomes smaller than the distance assumed in the extended state, as illustrated in FIG. 16 or FIG. 17. Namely, the distance between the lens holding portion 222 at the first lens group chamber 220 and the second lens group chamber 250 becomes reduced. In this state, the first lens group chamber 220 is housed inside the fixed tube 211.

It is to be noted that while FIG. 16 shows the AF lens group 241 at the infinity position in the contracted state, FIG. 17 shows the AF lens group 241 at the close-up position in the contracted state. As FIG. 16 and FIG. 17 clearly indicate, the distance between the lens holding portion 222 at the first lens group chamber 220 and the first guide plate 231 at the STM mounting tube 230 is smaller in the contracted state compared to the distance in the extended state, and since the AF lens group 241, too, comes to a stop as the STM mounting tube 230 becomes stationary, the AF lens group 241 and the second lens group 251 do not interfere with each other in the contracted state regardless of the position of the AF lens group 241.

—Transitioning from the Contracted State to the Extended State—

Next, an extending operation of the interchangeable lens barrel 200A will be explained. As the zooming ring 205 is rotated along a direction opposite from the direction for the contracting operation while pressing down on the retract release button 204 shown in FIG. 8 so as to switch from the contracted state to the extended state, the first lens group chamber 220 shown in FIG. 16 moves along a direction opposite from that taken for the contracting operation, i.e., along a direction moving away from the second lens group chamber 250, and as a result, the extended state shown in FIG. 9 or FIG. 10 is resumed.

The following advantages and operations are achieved through the second embodiment described above.

(1) The interchangeable lens barrel 200A includes the AF lens group chamber 240 that holds the AF lens group 241, the AF stepping motor 270 linked to the AF lens group chamber 240, which drives the AF lens group chamber 240 along the direction of the optical axis, the STM mounting tube 230, which is allowed to move along the optical axis OA together with the AF stepping motor 270 mounted thereat, and the coil spring 281, which imparts force to the STM mounting tube 230 in one direction along the optical axis.

Since force is applied to the STM mounting tube 230 at all times along the one direction as described above, its position inside the interchangeable lens barrel 200A (more specifically, the position of the STM mounting tube 230 relative to the first lens group chamber 220) can be stabilized. In addition, as the STM mounting tube 230 is pushed from another direction during a contracting operation so as to set the length of the coil spring 280 smaller than that assumed in the extended state, the space taken up by the STM mounting tube 230 in the extended state can be occupied by another member. In more specific terms, the first lens group chamber 220 moves together with the STM mounting tube 230 toward the image sensor side and, as a result, the second lens group chamber 250 pushes the STM mounting tube 230 toward the subject side inside the first lens group chamber 220 in the embodiment. As the position of the STM mounting tube 230 inside the first lens group chamber 220 moves further toward the subject side, part of the second lens group chamber 250 can be housed in the inner circumferential side of the first lens group chamber 220 so as to reduce the barrel length L. This, in turn, makes it possible to miniaturize the interchangeable lens barrel 200A. It is to be noted that while the STM mounting tube 230 takes different positions relative to the first lens group chamber 220 in the contracted state and in the extended state in the embodiment described above, the STM mounting tube 230 may instead assume different positions relative to the first lens group chamber 220 in correspondence to the focal length condition or the photographing distance.

(2) The interchangeable lens barrel 200A includes the first lens group 223 disposed at a position facing opposite the AF lens group 241 on the object side and the first lens group chamber 220 that holds the first lens group 223 and is allowed to move along the optical axis OA together with the first lens group 223. The coil spring 281 is disposed between the first lens group chamber 220 and the STM mounting tube 230 at the interchangeable lens barrel 200A. Force is applied to the first lens group chamber 220 in the one direction along the optical axis OA via the coil spring 281 opposing the force applied to the STM mounting tube 230.

Through these measures, the position taken by the STM mounting tube 230 along the optical axis OA relative to the first lens group chamber 220 can be held in a stable manner. With the position taken by the STM mounting tube 230 relative to the first lens group chamber 220 stabilized, the position of the AF lens group 241, which is held by the STM mounting tube 230 via the AF stepping motor 270, taken along the optical axis OA, too, becomes stable, making it possible to prevent deterioration in the optical performance of the interchangeable lens barrel 200A. In addition, since the first lens group chamber 220 and the STM mounting tube 230 can be set closer to each other in the contracted state by shortening the coil spring 281 compared to its length in the extended state, the barrel length L can be reduced in the contracted state. This, in turn, makes it possible to miniaturize the interchangeable lens barrel 200A. It is to be noted that the interchangeable lens barrel 200A is switched from the extended state to the contracted state through a manual operation of the zooming ring performed by the user. If, on the other hand, a drive force imparted from a motor or the like were used to switch from the extended state to the contracted state, a motor or the like capable of outputting a significant drive force against the force imparted from the coil spring 281 would have to be installed in the interchangeable lens barrel 200A, and in such a case, the interchangeable lens barrel 200A would have to be larger. In contrast, resistance against the force imparted by the coil spring 281 can be achieved through a manual operation in the embodiment described above, and since this eliminates the need for a motor capable of outputting a large drive force, the interchangeable lens barrel 200A does not need to be a large size lens barrel.

(3) The interchangeable lens barrel 200A includes the main guide bar 261 that guides the AF lens group chamber 240 and the STM mounting tube 230 so as to allow them to move along the optical axis OA.

The main guide bar 261 ranges substantially parallel to the optical axis OA. The STM mounting tube 230 includes a pair of guide plates, i.e., the first guide plate 231 and the second guide plate 232, set apart from each other and respectively having the through holes 231a and 232a formed thereat, through which the main guide bar 261 passes, and the linking portion 233 that links the pair of guide plates, i.e., the first guide plate 231 and the second guide plate 232 with each other.

At the AF lens group chamber 240, the insertion holes 240a and 240b, through which the main guide bar 261 passes, are formed between the pair of guide plates i.e., the first and the second guide plates 231 and 232, at the STM mounting tube 230.

Thus, as the STM mounting tube 230 moves along the optical axis OA, the AF lens group chamber 240, too, moves together with the STM mounting tube 230 in the same direction due to the linkage between the AF stepping motor 270 and the AF lens group chamber 240, and also, as the AF stepping motor 270 is driven, the AF lens group chamber 240 can be moved relative to the STM mounting tube 230. In other words, the AF lens group chamber 240 can be moved along the optical axis OA during a zooming operation by moving the first lens group chamber 220 (by moving the first lens group chamber 220 through the cam engagement of the cam groove 212a at the cam barrel 212 and the cam follower 221a at the first lens group chamber 220 with each other), whereas the AF lens group chamber 240 is moved along the optical axis OA during a focusing operation with the drive force provided by the AF stepping motor 270. This means that even if the in-focus position changes during a zooming operation, a focusing operation can be executed while the zooming operation is in progress so as to correct the in-focus position. As a result, the user is able to prevent the in-focus position from shifting through the focusing operation executed while the zooming operation is in progress.

(4) The interchangeable lens barrel 200A includes the first lens group 223 disposed at a position facing opposite the AF lens group 241 on the object side, the first lens group chamber 220 that holds the first lens group 223 and is allowed to move together with the first lens group 223 along the optical axis OA, and the main guide bar 261 fixed to the first lens group chamber 220, which guides the AF lens group chamber 240 and the STM mounting tube 230 so as to allow them to move along the optical axis OA.

These structural features make it possible to enable a rectilinear guide member for the AF lens group chamber 240 to also function as a rectilinear guide member for the STM mounting tube 230, and as a result, the number of required parts can be reduced. In addition, by ensuring that the main guide bar 261 is held relative to the first lens group chamber 220 with high accuracy, the AF lens group chamber 240 and the STM mounting tube 230 are also allowed to move with high accuracy. Consequently, highly accurate movement is enabled with better ease compared to a case in which separate rectilinear guide members for the AF lens group chamber 240 and for the STM mounting tube 230 are held with high accuracy.

(5) The interchangeable lens barrel 200A includes the first lens group 223 disposed at a position facing opposite the AF lens group 241 on the object side and the first lens group chamber 220 that holds the first lens group 223 and is allowed to move together with the first lens group 223 along the optical axis OA. The first lens group chamber 220 includes the main guide bar adjustment plate 263, with which the STM mounting tube 230, pressed in one direction along the optical axis OA with the force imparted from the coil spring 281, comes in contact.

Thus, since the force imparted by the coil spring 281 is applied to the STM mounting tube 230 toward the main guide bar adjustment plate 263 at the first lens group chamber 220, the STM mounting tube 230 moves as one with the first lens group chamber 220 in the extended state and the STM mounting tube 230 is allowed to move relative to the first lens group chamber 220 during a contracting operation, which makes it possible to miniaturize the interchangeable lens barrel 200A.

(6) The interchangeable lens barrel 200A includes the contact portion 252 at the second lens group chamber 250 having a variable distance to the STM mounting tube 230 along the optical axis OA. Via the contact portion 252 at the second lens group chamber 250, the STM mounting tube 230 can be moved along a direction opposite from the one direction mentioned earlier against the force imparted by the coil spring 281. As a result, the distance between the first lens group chamber 220 and the second lens group chamber 250 can be reduced, which ultimately makes it possible to reduce the lens barrel length L.

The following variations are also within the scope of the present invention, and one or more of the variations may be adopted in combination with the second embodiment described above.

(Variation 1)

The sub guide bar 262 and the coil spring 282 mounted at the sub guide bar 262 do not need to be included. In addition, a DC motor or an ultrasonic motor may be used in place of the AF stepping motor 270. Furthermore, the first lens group 223, the AF lens group 241 and the second lens group 251 may include a greater or smaller number of lenses than those in the examples in the drawings.

(Variation 2)

The camera system 1 achieved in the embodiment described above includes a telescopic interchangeable lens that assumes a smaller lens barrel length when the camera is not in use. The camera achieved as a variation of the embodiment is a retractable-lens camera having a fixed lens barrel that cannot be detached from the camera body. A retractable-lens camera includes a mechanism whereby the lens barrel is partly or entirely housed inside the camera body when the camera is not in use and the lens barrel projects out of the camera body when the camera is in use.

Primary differences between the retractable-lens camera in variation 2 and the telescopic interchangeable lens barrel achieved in the embodiment described above are that the STM mounting tube 230, the AF lens group chamber 240, the second lens group chamber 250 and the like in FIG. 9 are built into the camera body in the retractable-lens camera, which does not include the fixed tube 211 or the cam barrel 212, and that the first lens group chamber 220 is driven along the optical axis via an actuator (not shown).

When the retractable-lens camera is in use, the first lens group chamber 220 projects out of the camera body and a zooming operation and a focusing operation are executed in this condition, in much the same way as in the telescopic interchangeable lens barrel 200A achieved in the embodiment described earlier.

During a retracting operation, the first lens group chamber 220 in the retractable-lens camera is caused to move toward the second lens group chamber 250 along the optical axis via an actuator (not shown). As the first lens group chamber 220 moves, the STM mounting tube 230 also moves along the same direction until it comes into contact with the contact portion 252 at the second lens group chamber 250 and stops moving. The first lens group chamber 220, continuously driven via the actuator (not shown), moves closer to the STM mounting tube 230 so as to reduce the distance between the lens holding portion 222 and the first guide plate 231 at the STM mounting tube 230. As a result, the first lens group chamber 220, having projected out of the camera body while the camera is in use, enters a retracted state, in which the extent to which it projects out is reduced or the extent of projection becomes substantially equal to zero.

(Variation 3)

While the second lens group chamber 250 is fixed in the embodiment described above, it may instead be configured so as to be allowed to move along the optical axis OA.

(Variation 4)

While the left side is designated as the subject side and the right side is designated as the image sensor side in FIGS. 9 through 12, 16 and 17 in reference to which the embodiment has been explained, the left side and the right side may instead be respectively designated as the image sensor side and the subject side.

(Variation 5)

In the embodiment described above, the rack portion 242 is mounted at the AF lens group chamber 240. The rack portion 242 is threaded so as to interlock with the lead screw 271 of the AF stepping motor 270. As an alternative, a threaded nut portion that interlocks with the lead screw 271 may be disposed at the AF lens group chamber 240 in place of the rack portion 242.

The second embodiment of the present invention described above also includes the following aspects.

(1) The lens barrel in an eighth aspect comprises a first lens holding member that holds at least one first lens, a drive source that is linked to the first lens holding member and drives the first lens holding member along a direction of an optical axis, a mounting member with the drive source mounted thereat, which is allowed to move together with the drive source along the optical axis, and a force-applying member that applies force to the mounting member in one direction along the optical axis.

(2) In a ninth aspect, the lens barrel in the eighth aspect includes a second lens disposed at a position facing opposite the first lens on an object side or on an image plane side, and a second lens holding member that holds the second lens and is allowed to move together with the second lens along the optical axis. The force-applying member is disposed between the second lens holding member and the mounting member, and force is applied by the force-applying member to the second lens holding member along a direction opposite from the direction of the force applied to the mounting member in the one direction running along the optical axis.

(3) In a tenth aspect, the lens barrel in the eighth aspect or the ninth aspect includes a guide member that guides the first lens holding member and the mounting member so as to allow them to move along the optical axis. The guide member is a guide bar extending substantially parallel to the optical axis. The mounting member includes a pair of guide plates set apart from each other and having guide holes through which the guide bar passes, and a linking portion that links the pair of guide plates with each other. The first lens holding member includes a guide hole through which the guide bar passes, located between the pair of guide plates.

(4) In an 11th aspect, the lens barrel in any one of the eighth through tenth aspects includes a second lens disposed at a position facing opposite the first lens on an object side or on an image plane side, a second lens holding member that holds the second lens and is allowed to move together with the second lens along the optical axis, and a guide member fixed to the second lens holding member, which guides the first lens holding member and the mounting member so as to allow them to move along the optical axis.

(5) In a 12th aspect, the drive source in the lens barrel in any one of the eighth through 11th aspects includes a motor and a lead screw rotated by the motor, and the first lens holding member in the lens barrel includes an interlocking portion that interlocks with the lead screw.

(6) In a 13th aspect, the lens barrel in any one of the eighth through 12th aspects includes a second lens disposed at a position facing opposite the first lens on an object side or on an image plane side, and a second lens holding member that holds the second lens and is allowed to move together with the second lens along the optical axis. The second lens holding member includes a contact portion against which the mounting member, with force applied thereto by the force-applying member in the one direction along the optical axis, comes in contact.

(7) In a 14th aspect, the lens barrel in any one of the eighth through 13th aspects includes a regulating member with a variable distance to the mounting member along the optical axis. The regulating member is capable of causing the mounting member to move along a direction opposite from the one direction against the force applied by the force-applying member.

(8) In a 15th aspect, the regulating member in the lens barrel in the 14th aspect is a lens holding member that holds a third lens. The regulating member assumes a smaller distance to the mounting member through a retracting operation or a contracting operation.

(9) An optical device in a 16th aspect includes the lens barrel in any one of the eighth through 15th aspects.

While embodiments and variations thereof have been described above, the present invention is in no way limited to the particulars of these examples. Any other mode conceivable within the scope of the technical teaching of the present invention is also within the scope of the present invention.

The disclosures of the following priority applications are herein Incorporated by reference:

Japanese Patent Application No. 2016-116105 filed Jun. 10, 2016

Japanese Patent Application No. 2016-116106 filed Jun. 10, 2016

REFERENCE SIGNS LIST

1; camera system, 100; camera body, 200, 200A; interchangeable lens barrel, 212; cam barrel, 220; first lens group chamber, 221; tube portion, 221a, 233a; cam follower, 222; lens holding portion, 223; first lens group, 230; STM mounting tube, 231; first guide plate, 232; second guide plate, 233; linking portion, 240; AF lens group chamber, 241; AF lens group, 242; rack portion, 250; second lens group chamber, 251; second lens group, 252; contact portion, 261; main guide bar, 263; main guide bar adjustment plate, 270; AF stepping motor, 271; lead screw, 281, 282; coil spring

The invention claimed is:

1. A lens barrel, comprising:
a first lens;
a first tube that holds the first lens and moves along an optical axis;
a focusing lens disposed to face the first lens;
an actuator that drives the focusing lens;

a second tube that holds the focusing lens and the actuator and comprises a first cam follower, the second tube being configured to move along the optical axis; and a third tube having a first groove that engages with the first cam follower, wherein:

the actuator and the second tube move as one along the optical axis through the first cam follower;

the focusing lens is movable relative to the second tube along the optical axis by the actuator; and the first tube and the second tune move along the optical axis independently of each other.

2. A lens barrel, comprising:

a first lens;

a first tube that holds the first lens and moves along an optical axis;

a focusing lens disposed to face the first lens;

an actuator that drives the focusing lens;

a second tube that holds the focusing lens and the actuator and comprises a first cam follower, the second tube being configured to move along the optical axis; and a third tube having a first groove that engages with the first cam follower, wherein:

the actuator and the second tube move as one along the optical axis through the first cam follower;

the focusing lens is movable relative to the second tube along the optical axis by the actuator;

the first tube includes a second cam follower; and the third tube includes a second groove that engages with the second cam follower.

3. A lens barrel, comprising:

a first lens;

a first tube that holds the first lens and moves along an optical axis;

a focusing lens disposed to face the first lens;

an actuator that drives the focusing lens;

a second tube that holds the focusing lens and the actuator and comprises a first cam follower, the second tube being configured to move along the optical axis; and a third tube having a first groove that engages with the first cam follower, wherein:

the actuator and the second tube move as one along the optical axis through the first cam follower;

the focusing lens is movable relative to the second tube along the optical axis by the actuator; and the third tube rotates according to a zooming operation.

4. The lens barrel according to claim 1, further comprising:

a focusing lens frame that supports the focusing lens, wherein:

an engaging portion included at the focusing lens frame is in contact with a shaft included in the actuator.

5. The lens barrel according to claim 4, wherein:

the engaging portion includes a thread that interlocks with the shaft.

6. The lens barrel according to claim 4, further comprising:

a nut that includes the thread to interlock with the shaft.

7. The lens barrel according to claim 1, further comprising:

a focusing lens frame that supports the focusing lens; and a shaft portion that guides the focusing lens frame and the second tube so as to be movable along the optical axis.

8. The lens barrel according to claim 7, wherein:

one side of the shaft portion is supported by the first tube.

9. The lens barrel according to claim 8, wherein:

another side of the shaft portion is supported by an adjustment plate; and the adjustment plate is fixed to the first tube.

10. The lens barrel according to claim 1, further comprising:

a retraction mechanism.

11. An image capturing device that includes the lens barrel according to claim 1.

* * * * *